United States Patent
Liu et al.

(10) Patent No.: US 10,866,846 B2
(45) Date of Patent: Dec. 15, 2020

(54) APPLICATION INTERACTION METHOD, APPARATUS, AND SYSTEM, AND PHYSICAL MACHINE

(71) Applicant: HUAWEI TECHNOLOGIES CO., LTD., Shenzhen, Guangdong (CN)

(72) Inventors: Xiaoxu Liu, Shenzhen (CN); Kai Zheng, Beijing (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 0 days.

(21) Appl. No.: 16/455,313

(22) Filed: Jun. 27, 2019

(65) Prior Publication Data

US 2019/0317846 A1 Oct. 17, 2019

Related U.S. Application Data

(63) Continuation of application No. PCT/CN2017/105888, filed on Oct. 12, 2017.

(30) Foreign Application Priority Data

Dec. 30, 2016 (CN) .......................... 2016 1 1264191

(51) Int. Cl.
*G06F 3/00* (2006.01)
*G06F 9/54* (2006.01)
(Continued)

(52) U.S. Cl.
CPC .............. *G06F 9/547* (2013.01); *G06F 8/60* (2013.01); *G06F 9/445* (2013.01); *G06F 9/544* (2013.01); *G06F 9/546* (2013.01)

(58) Field of Classification Search
CPC ...................................................... G06F 9/541
(Continued)

(56) References Cited

U.S. PATENT DOCUMENTS

| 8,429,675 B1 | 4/2013 | Radhakrishnan et al. |
| 2002/0161848 A1* | 10/2002 | Willman .................. G06F 9/54 709/213 |

(Continued)

FOREIGN PATENT DOCUMENTS

| CN | 1477502 A | 2/2004 |
| CN | 101471953 A | 7/2009 |

(Continued)

OTHER PUBLICATIONS

Robert J. Stets, Component-Based APIs for Versioning and Distributed Applications. (Year: 1990).*

*Primary Examiner* — Lechi Truong
(74) *Attorney, Agent, or Firm* — Womble Bond Dickinson (US) LLP

(57) ABSTRACT

Embodiments of the present invention provide an application interaction method, apparatus, and system. The method includes: receiving, by a transmission configuration module, a first instruction, where the first instruction includes an identifier of a first application and an identifier of a second application; determining, by the transmission configuration module, deployment information of the first application and deployment information of the second application based on the first instruction; determining, by the transmission configuration module, an information transmission mode between the first application and the second application based on the deployment information of the first application, the deployment information of the second application, and a transmission mode selection policy; and using, by the first application, the transmission mode to transmit information to the second application.

19 Claims, 7 Drawing Sheets

(51) Int. Cl.
*G06F 8/60* (2018.01)
*G06F 9/445* (2018.01)

(58) Field of Classification Search
USPC .......................................................... 719/328
See application file for complete search history.

(56) References Cited

U.S. PATENT DOCUMENTS

| | | | |
|---|---|---|---|
| 2003/0115373 A1* | 6/2003 | Beck | G06F 9/546 |
| | | | 719/315 |
| 2007/0067488 A1* | 3/2007 | McIntire | G06F 9/54 |
| | | | 709/238 |
| 2009/0328073 A1 | 12/2009 | Tripathi | |
| 2013/0191826 A1 | 7/2013 | Heninger et al. | |
| 2014/0359614 A1 | 12/2014 | Spracklen et al. | |
| 2014/0372510 A1 | 12/2014 | Fausak et al. | |

FOREIGN PATENT DOCUMENTS

| | | | |
|---|---|---|---|
| CN | 102103526 A | 6/2011 | |
| CN | 102137123 A | 7/2011 | |
| CN | 102567121 A | 7/2012 | |
| CN | 103347077 A | 10/2013 | |
| CN | 104794095 A | 7/2015 | |

\* cited by examiner

APPLICATION INTERACTION METHOD, APPARATUS, AND SYSTEM, AND PHYSICAL MACHINE

CROSS-REFERENCE TO RELATED APPLICATIONS

This application is a continuation of International Application No. PCT/CN2017/105888, filed on Oct. 12, 2017, which claims priority to Chinese Patent Application No. 201611264191.8, filed on Dec. 30, 2016. The disclosures of the aforementioned applications are hereby incorporated by reference in their entireties.

TECHNICAL FIELD

Embodiments of the present invention relate to the communications field, and more specifically, to an application interaction method, apparatus, and system, and a physical machine.

BACKGROUND

Exchange of information frequently happens between computer applications. For example, a computer task can be divided into a plurality of child tasks. The plurality of child tasks may be deployed onto a plurality of applications for execution, and communication may be performed between the plurality of applications. For example, these applications may be described by using a client/server (C/S) software system architecture. In this architecture, a client and a server are applications. Specifically, an application serving as a client requests a service, and an application serving as a server provides the service for the application serving as the client. In this way, the plurality of applications can be deployed on a same physical device or different physical devices, to fully utilize advantages of hardware environments of the client and the server. Apparently, communication needs to be performed between the server and the client to exchange information.

At present, as technologies such as a virtualization technology and a microservice application architecture are all used in application deployment, a deployment relationship between applications becomes more complex and changes more frequently. In the prior art, however, inter-application information transmission modes are rather monotonous and fixed, and cannot satisfy a requirement of inter-application information transmission, affecting performance of inter-application information transmission.

SUMMARY

In view of this, embodiments of the present invention provide an application interaction method and apparatus, and a terminal, so that an inter-application information transmission mode can better adapt to an application deployment manner, thereby improving information transmission performance.

To achieve the foregoing objective, the following technical solutions are used in the embodiments of this application.

According to a first aspect, an application interaction method is provided. The method includes: receiving, by a transmission configuration module, a first instruction, where the first instruction includes an identifier of a first application and an identifier of a second application; determining, by the transmission configuration module, deployment information of the first application and deployment information of the second application based on the first instruction, where the deployment information of the first application includes a location of a first node in which the first application is located, and the deployment information of the second application includes a location of a second node in which the second application is located; and determining, by the transmission configuration module, an information transmission mode between the first application and the second application based on the deployment information of the first application, the deployment information of the second application, and a transmission mode selection policy, where the transmission mode selection policy includes a correspondence between the deployment information of the first application and the transmission mode and a correspondence between the deployment information of the second application and the transmission mode, or the transmission mode selection policy includes a correspondence between the transmission mode and a deployment relationship between the first application and the second application, and the deployment relationship between the first application and the second application includes a relationship between the location of the first node and the location of the second node; and using, by the first application, the transmission mode to transmit information to the second application.

Therefore, an information transmission mode more suitable for two applications that need to communicate with each other is selected for the two applications by using a transmission mode selection policy and a determined deployment relationship between the two applications that need to communicate with each other, or by using a transmission mode selection policy and determined deployment information of the two applications that need to communicate with each other. In this way, an information transmission mode can be more flexibly configured for applications that need to communicate with each other, to improve information transmission performance.

It should be understood that the node in this application file is a device or an apparatus that can perform communication and in which an operating system runs, or may be a logical node, for example, a virtual machine, a container, or another apparatus having the foregoing functions. From a given perspective, an operating system of a physical machine may be considered as a node; or the node is a physical node, that is, a physical machine including hardware or a computer, for example, a terminal, a server, or another device having the foregoing functions.

An identifier of an application is information that can indicate the application. For example, the identifier may be identity information of the application such as an ID, address information of the application such as an IP address or a network segment, or network information of the application such as a port number of the application. Certainly, the identifier may alternatively be a combination of the plurality of types of information provided that the combination or information included in the identifier can be used to distinguish the application from other applications.

In one embodiment, the transmission mode selection policy includes the correspondence between the transmission mode and the deployment relationship between the first application and the second application, and the method further includes: determining, by the transmission configuration module, the deployment relationship between the first application and the second application based on the deployment information of the first application and the deployment information of the second application.

In one embodiment, the first instruction is a query instruction, and the query instruction is used to query for the deployment information of the first application and the deployment information of the second application, or the query instruction is used to query for the deployment relationship between the first application and the second application, or the query instruction is used to query for the transmission mode between the first application and the second application.

In one embodiment, the receiving, by a transmission configuration module, a first instruction includes:

receiving, by the transmission configuration module, the query instruction by using a first interface function of a socket, where content of a function library called by the first interface function is set to being used to process a connection instruction or a write instruction delivered by the first application into the query instruction, and send the query instruction to the transmission configuration module for processing to determine the transmission mode; the connection instruction indicates that the first application requests to establish a connection to the second application, and the write instruction indicates that the first application instructs to write, into a first storage unit, information that is to be transmitted to the second application.

In one embodiment, the first instruction is a connection instruction or a write instruction delivered by the first application, the connection instruction indicates that the first application requests to establish a connection to the second application, and the write instruction indicates that the first application instructs to write, into a first storage unit, information that is to be transmitted to the second application.

In one embodiment, the receiving, by a transmission configuration module, a first instruction includes:

receiving, by the transmission configuration module, the connection instruction or the write instruction by using a first interface function of a socket, where content of a function library called by the first interface function is set to being used to send the connection instruction or the write instruction delivered by the first application, to the transmission configuration module for processing to determine the transmission mode.

In one embodiment, the transmission configuration module may alternatively receive the query instruction by using another API interface. However, a function of the API interface is similar to that of the first interface function. For example, a self-defined interface is used instead of a default protocol port, or a form of a prior-art interface is changed. Then, the first application and an operating system running the first application need to be programmed, to change a processing process on a connection request delivered by the first application in the prior art. In this way, the connection request is processed by the transmission configuration module to determine an appropriate transmission mode.

It should be understood that what the first application delivers is the connection instruction or the write instruction. In this case, the interface function or another interface needs to be capable of processing the connection instruction or the write instruction into the query instruction, to facilitate use by the transmission configuration module. In this way, the transmission configuration module has a relatively monotonous function and is relatively lightweight, and no complex processing is required. In contrast, improvement of the API is more complex.

In one embodiment, the determining, by the transmission configuration module, deployment information of the first application and deployment information of the second application based on the first instruction includes: obtaining, by the transmission configuration module, the deployment information of the first application from a second storage module based on the identifier of the first application; and obtaining, by the transmission configuration module, deployment information of the second application from a third storage module based on the identifier of the second application, where the third storage module is a memory that is the same as or different from the second storage module; or when the deployment information of the second application is not stored in the third storage module, obtaining, by the transmission configuration module, the deployment information of the second application from a global configuration node based on the identifier of the second application.

Therefore, the transmission configuration module may need to obtain information from the global configuration node. In this way, the transmission configuration module does not need to manage deployment information of all applications within a range to which the method is applicable. In such a distributed deployment information management method, updating, management, and exchange of deployment information are simpler, and storage resources are saved.

In one embodiment, the location of the first node in which the first application is located includes network information of the first application, network information of the first node, or address information of the node in which the first application is located, and the location of the second node in which the second application is located includes network information of the second application, network information of the second node, or address information of the node in which the second application is located.

In one embodiment, the transmission mode includes one of the Transmission Control Protocol/Internet Protocol (TCP/IP), the User Datagram Protocol (UDP), remote direct memory access (RDMA), memory sharing, and interprocess communication (Domain_Socket).

In one embodiment, the first node is a first container, and the second node is a second container; and the determining, by the transmission configuration module, a transmission mode for information transmission between the first application and the second application based on the deployment information of the first application, the deployment information of the second application, and a transmission mode selection policy includes: when the first container and the second container are located in a same physical machine and the first container and the second container belong to a same pod, determining, by the transmission configuration module, that the transmission mode for information transmission between the first application and the second application is memory sharing; or when the first container and the second container are located in a same physical machine and the first container and the second container belong to different pods, determining, by the transmission configuration module, that the transmission mode for information transmission between the first application and the second application is interprocess communication (Domain_Socket).

In other words, when both the first node and the second node are containers, a service relationship between the two applications may also be considered.

In an implementation of the first aspect, when the transmission mode is using the TCP/IP protocol for transmission, the method further includes: encapsulating, by the first node, the connection request as a link establishment request by using the TCP/IP protocol; sending, by the first node, the link establishment request to the second application; and receiving, by the first application, a response packet from the second application, where the response packet is a TCP/IP packet. Correspondingly, the using, by the first application, the transmission mode to transmit information to the second application includes: using, by the first application, the TCP/IP protocol to transmit the information to the second application.

It should be understood that, after the transmission configuration module determines the transmission mode, the connection instruction or the write instruction used as the first instruction may be further distributed to an interface corresponding to the corresponding transmission mode for processing, for example, sent to a target device (for example, an I/O device or a storage device), or sent to a target node.

In an implementation of the first aspect, the using, by the first application, the transmission mode to transmit information to the second application includes: configuring, by the first application, an interface function of the socket based on the transmission mode returned by the transmission configuration module; and using, by the first application, the transmission mode to transmit the information to the second application by using the configured second interface function of the socket.

In this way, during subsequent interaction with the second application, the first application can use the interface corresponding to the transmission mode, and the transmission configuration module no longer needs to make a decision. Certainly, the first application needs to configure a corresponding interface based on the returned transmission mode because the first application supports a plurality of interfaces.

It should be understood that the transmitted information may be information that is transmitted to the second application subsequent to the write instruction or the connection instruction. Alternatively, the transmitted information may be the write instruction or the connection instruction, because in the sense of a whole procedure, the write instruction or the connection instruction is delivered to the second application by the first application by using the interface corresponding to the transmission mode.

In one embodiment, the method further includes: sending, by the first application, a second instruction to the transmission configuration module, where the second instruction includes the deployment information of the first application; storing, by the transmission configuration module, the deployment information of the first application into the second storage module; and sending, by the transmission configuration module, the deployment information of the first application to the global configuration node.

In this way, the global configuration node maintains the information about the first application.

According to a second aspect, an embodiment of the present invention provides an application interaction apparatus, where the apparatus includes a transmission configuration module and an instruction transmission module. The transmission configuration module is configured to receive a first instruction, where the first instruction includes an identifier of a first application and an identifier of a second application; the transmission configuration module is configured to determine deployment information of the first application and deployment information of the second application based on the first instruction, where the deployment information of the first application includes a location of a first node in which the first application is located, and the deployment information of the second application includes a location of a second node in which the second application is located; the transmission configuration module is configured to determine an information transmission mode between the first application and the second application based on the deployment information of the first application, the deployment information of the second application, and a transmission mode selection policy, where the transmission mode selection policy includes a correspondence between the deployment information of the first application and the transmission mode and a correspondence between the deployment information of the second application and the transmission mode, or the transmission mode selection policy includes a correspondence between the transmission mode and a deployment relationship between the first application and the second application, and the deployment relationship between the first application and the second application includes a relationship between the location of the first node and the location of the second node; and the instruction transmission module is configured to use the transmission mode to transmit information that is to be transmitted by the first application to the second application.

According to a third aspect, an embodiment of the present invention provides a physical machine, where the physical machine is used for application interaction, and the physical machine includes a processor, a memory, and a transceiver. The processor, the memory, and a communications interface are connected by using a bus; the communications interface is configured to execute a program in the memory to send information to or receive information from another device; and the processor is configured to perform the method according to the implementations of the first aspect by running an instruction in the memory.

Because the second aspect and the third aspect describe the apparatuses corresponding to the first aspect, for various specific implementations, related descriptions, and beneficial effects, refer to the descriptions of the implementations of the first aspect. Details are not described herein again.

According to a fourth aspect, an embodiment of the present invention provides an application interaction method. The method includes: receiving, by a second application, a connection instruction or a data packet from a first application, where the connection instruction indicates that the first application requests to establish a connection to the second application; determining, by the second application, a transmission mode corresponding to the connection instruction or the data packet; and using, by the second application, the transmission mode to transmit information to the first application.

In one embodiment, in determining, by the second application, a transmission mode corresponding to the connection instruction or the data packet, the method includes: parsing, by the second application, the connection instruction or the data packet, to determine the transmission mode corresponding to the connection instruction or the data packet.

In one embodiment, in determining, by the second application, a transmission mode corresponding to the connection instruction or the data packet, the method includes: determining, by a transmission control module, a transmission mode between the first application and the second application based on the connection instruction or the data packet and a transmission mode selection policy, where the connection instruction or the data packet includes an identifier of the first application and an identifier of the second application, the transmission mode selection policy includes a correspondence between deployment information of the first application and the transmission mode and a correspondence between deployment information of the second application and the transmission mode, or the transmission mode selection policy includes a correspondence between the transmission mode and a deployment relationship between the first application and the second application, and the deployment relationship between the first application and the second application includes a relationship between a location of a first node and a location of a second node; determining, by the second application by using the transmission control module, the transmission mode corresponding to the connection instruction or the data packet.

In determining, by the second application, a transmission mode corresponding to the connection instruction or the data packet, the method includes: parsing, by the second application, the connection instruction or the data packet, to determine the transmission mode corresponding to the connection instruction or the data packet.

In one embodiment, the method further includes: sending, by the second application, the deployment information of the second application to a second transmission configuration module, where the deployment information includes at least one of the location of the second node and network information of the second node; and storing, by the second transmission configuration module, the deployment information of the second application into the second transmission configuration module.

In one embodiment, the method further includes: sending, by the second transmission configuration module, the deployment information of the second application to a global configuration node.

According to a fifth aspect, an embodiment of the present invention provides a physical machine, where the physical machine is used for application interaction, and the physical machine includes a processor, a memory, and a transceiver. The processor, the memory, and a communications interface are connected by using a bus; the communications interface is configured to execute a program in the memory to send information to or receive information from another device; and the processor is configured to perform the method according to the implementations of the fourth aspect by running an instruction in the memory.

Because the fourth aspect describes a peer-end method of the first aspect and the fifth aspect describes an apparatus corresponding to the fourth aspect, for related descriptions and beneficial effects, refer to the descriptions of the implementations of the first aspect. Details are not described herein again.

According to a sixth aspect, a physical machine is provided. The physical machine includes a hardware layer, and a first node and a transmission configuration module that run on the hardware layer, where a first application runs in the first node, and the first node is a virtual machine or a container running on the hardware layer; the transmission configuration module is configured to: receive a first instruction, where the first instruction includes an identifier of the first application and an identifier of a second application; determine deployment information of the first application and deployment information of the second application based on the first instruction, where the deployment information of the first application includes a location of a first node in which the first application is located, and the deployment information of the second application includes a location of a second node in which the second application is located; and determine an information transmission mode between the first application and the second application based on the deployment information of the first application, the deployment information of the second application, and a transmission mode selection policy, where the transmission mode selection policy includes a correspondence between the deployment information of the first application and the transmission mode and a correspondence between the deployment information of the second application and the transmission mode, or the transmission mode selection policy includes a correspondence between the transmission mode and a deployment relationship between the first application and the second application, and the deployment relationship between the first application and the second application includes a relationship between the location of the first node and the location of the second node; and the first node is configured to use the transmission mode to transmit information to the second application.

Because the sixth aspect describes an apparatus corresponding to the method in the first aspect in a virtualization scenario, for various implementations, related descriptions, and beneficial effects, refer to the descriptions of the implementations of the first aspect. Details are not described herein again.

According to a seventh aspect, an embodiment of the present invention provides an application interaction system, where the system includes a first node, a second node, and a global configuration node. The global configuration node is configured to store deployment information of a plurality of applications running in the application interaction system, a first application runs in the first node, a second application runs in the second node, and the deployment information includes locations of nodes in which the applications are located; the first node is configured to send a query request to the global configuration node based on a connection instruction or a write instruction of the first application, where the connection instruction indicates that the first application requests to establish a connection to the second application, the write instruction indicates that the first application instructs to write, into a first storage unit, information that is to be transmitted to the second application, and the query request is used to query for deployment information of the second application; the global configuration node is configured to send found deployment information of the second application to the first node based on the query request; the first node is configured to determine an information transmission mode between the first application and the second application based on deployment information of the first application, the deployment information of the second application, and a transmission mode selection policy, where the transmission mode selection policy includes a correspondence between the deployment information of the first application and the transmission mode and a correspondence between the deployment information of the second application and the transmission mode, or the transmission mode selection policy includes a correspondence between the transmission mode and a deployment relationship between the first application and the second application, and the deployment relationship between the first application and the second application includes a relationship between a location of the first node and a location of the second node; the first node is configured to send a link establishment request or a data packet to the second node, where the link establishment request is obtained by processing the connection instruction based on the transmission mode, and the data packet is obtained based on the transmission mode and the write instruction; and the second node is configured to determine the transmission mode based on the received link establishment request or the received data packet, where the first node and the second node use the transmission mode to transmit information.

In one embodiment, the first node is further configured to send the deployment information of the first application to the global configuration node, so that the deployment information of the first application is registered with the global configuration node.

In one embodiment, the second node is further configured to send the deployment information of the second application to the global configuration node, so that the deployment information of the second application is registered with the global configuration node.

In one embodiment, the location of the first node in which the first application is located includes network information of the first application, network information of the first node, or address information of the node in which the first application is located, and the location of the second node in which the second application is located includes network information of the second application, network information of the second node, or address information of the node in which the second application is located.

In one embodiment, the transmission mode includes one of the TCP/IP, the UDP, RDMA, memory sharing, and interprocess communication (Domain_Socket).

Because the seventh aspect describes a system corresponding to the methods in the first aspect and the fourth aspect, for various specific implementations, related descriptions, and beneficial effects, refer to the descriptions of the implementations of the first aspect and the fourth aspect. Details are not described herein again.

According to an eighth aspect, a storage medium is provided. The storage medium is configured to store an application program, to perform the method according to any implementation of the first aspect or the fourth aspect.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
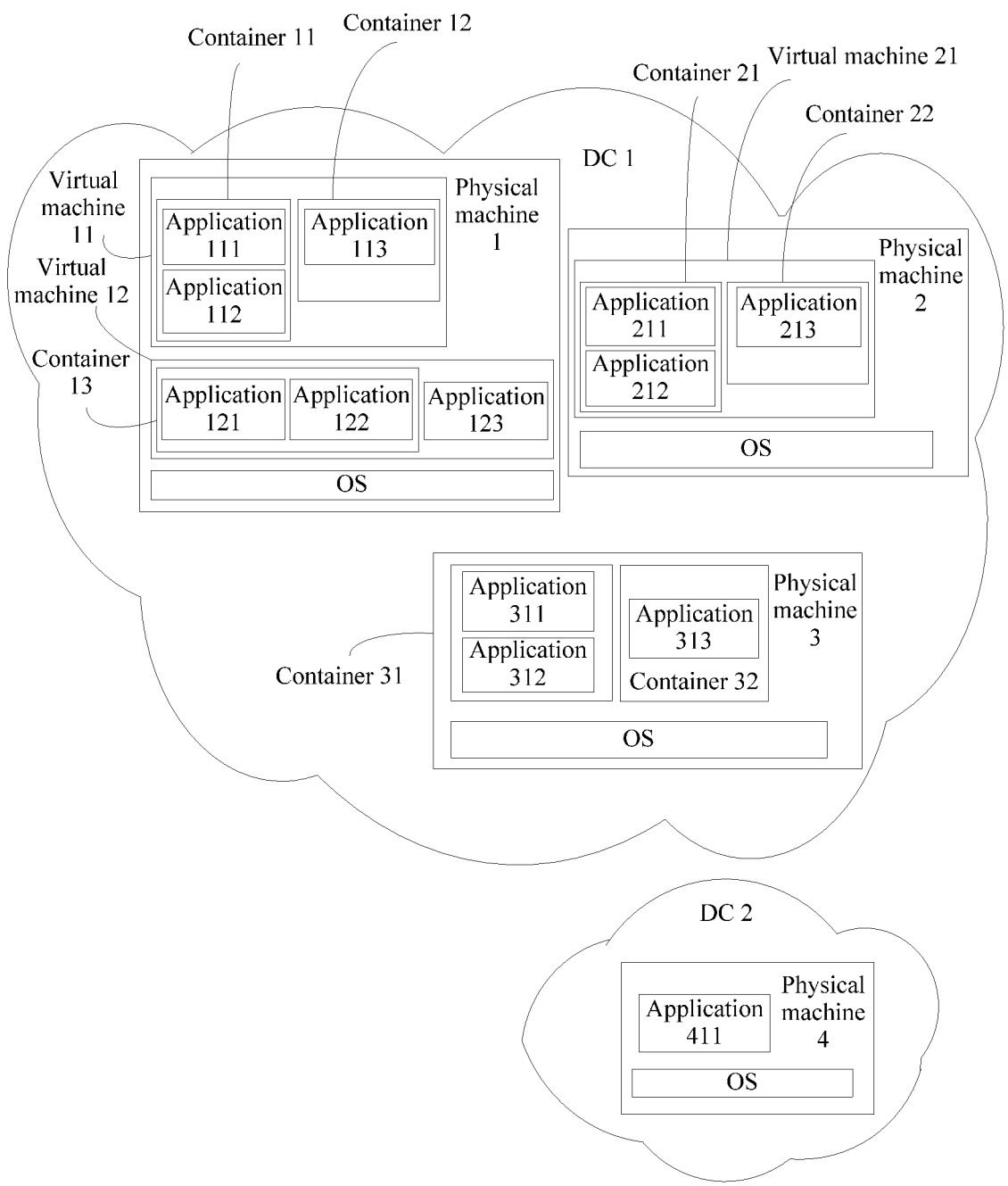
FIG. 1 is a schematic diagram of system networking according to an embodiment of the present invention.

The embodiments of the present invention provide an application interaction method, apparatus, and system, and a physical machine. The following describes the technical solutions in the embodiments of the present invention with reference to the accompanying drawings in the embodiments of the present invention.

The following describes some technical terms in the embodiments of the present invention.

Node: A node in this application file is a device or an apparatus on which an operating system runs and that can perform communication, or may be a logical node, for example, a virtual machine, a container, or another apparatus having the foregoing functions. From a given perspective, an operating system of a physical machine may be considered as a node; or the node is a physical node, that is, a physical machine including hardware or a computer, for example, a terminal, a server, or another device having the foregoing functions.

In other words, in a virtualization scenario, strictly, one application may be located in a plurality of nodes, and a node may be a container carrying the application, a virtual machine carrying the container, or a physical machine carrying the virtual machine or the container. For example, an application is in a container, the container is in a virtual machine, and the virtual machine is in a physical machine. In this case, the container, the virtual machine in which the container is located, and the physical machine in which the virtual machine is located are all nodes in which the application is located. However, generally the node in which the application is located is the container, that is, the node directly carrying the application. Certainly, in some scenarios, the node in which the application is located may be the virtual machine in which the container is located; in other scenarios, the node in which the application is located may be the physical machine in which the virtual machine is located. Whether a granularity of the node in which the application is located is as fine as a container or a virtual machine or whether only a hardware environment (that is, a physical machine) of the application is considered for the granularity, depends on a scenario considered in a transmission mode selection policy. For example, if only whether two applications are in one local area network, one data center, or one trusted domain needs to be determined, containers or virtual machines in which the applications are located do not need to be specified. If a location relationship between virtual machines is considered, for example, in a cloud scenario, nodes in which the applications are located need to be at least as fine as virtual machines. If more detailed analysis is required, for example, if a service relationship between the applications needs to be further analyzed, nodes in which the applications are located need to be as fine as containers (if the applications are in containers).

An identifier of an application refers to information that can represent the application. For example, an identifier may be identity information of the application such as an ID, address information of the application such as an IP address or a network segment, or network information of the application such as a port number of the application. Certainly, the identifier may alternatively be a combination of the plurality of types of information provided that the combination or information included in the identifier can be used to distinguish the application from other applications Applications may be deployed in a plurality of modes. At present, communications system networking is increasingly complex and may include a plurality of network devices (for example, a server and a gateway). In addition, the plurality of network devices can provide services for a plurality of terminals, and applications can run on all these network devices and terminals. The Transmission Control Protocol/Internet Protocol (TCP/IP) protocol is a commonly used communications protocol that can ensure reliable and error-free end-to-end transmission of user data in a complex network environment. Therefore, currently it is usual that the TCP/IP protocol is used for exchange of information between applications. The terminal in the embodiments of the present invention may be a mobile terminal (Mobile Terminal), for example, a portable, wearable, or in-vehicle mobile device such as a mobile phone, a tablet computer, a motion camera, or a notebook computer, or may be a device that can access a communications network such as a computer or a server.

However, a deployment relationship between applications that need to communicate with each other is highly variable. The following lists several typical deployment modes for applications that need to communicate with each other: ① deployed in different virtual machines in a same physical machine; ② deployed in a same container in a same host (a host is a physical machine or a virtual machine); ③ deployed in different containers in a same host; ④ deployed in different hosts in a same trusted domain; ⑤ deployed in different hosts in different trusted domains. Certainly, deployment scenarios of applications that need to communicate with each other are not limited to the foregoing examples. A host is a physical machine or a virtual machine in which an application is located. A trusted domain may be understood as a set of devices that consider data of one another as secure, and may be a local area network that is provided with a firewall. Specifically, for a connection established and information exchange between devices in the local area network, an information source and the connection are considered as secure and hence trustworthy. For information exchange between a device in the local area network and a device outside the local area network, security of information outside the local area network is unknown, and by default, this information is considered as insecure and hence untrustworthy. For example, physical machines in one data center (DC) belong to one trusted domain. A trusted domain may alternatively be a set of devices in other areas with trusted network security.

As can be learnt from the foregoing several scenarios, how applications are deployed directly determines reliability of network transmission. For example, reliability is relatively desirable in the scenarios ①, ②, and ③ One end of a connection deployed in the scenario ①, ②, or ③ can determine security of the other end of the connection, and there is no network transmission delay or packet loss. If the TCP/IP protocol is still used for transmission, a lot of redundancy is to be dealt with. Consequently, transmission efficiency is lowered, and processing resources for data packets are wasted. The scenario ④ is a highly reliable lossless network, and can provide relatively high assurance for network and transmission reliability, and therefore it seems unnecessary to use the TCP/IP protocol in this domain. The scenario ⑤ is a wide area network universal network that has a complex network environment and is subject to network attenuation and a packet loss, and therefore the TCP/IP protocol is more suitable to be used for transmission. Therefore, in different deployment scenarios, the TCP/IP protocol is not always suitable for inter-application information transmission. In addition, in the industry, other transmission technologies have also been studied to adapt to characteristics of various application deployment scenarios, thereby improving transmission performance. For example, a virtual switching technology based on memory sharing may be used in the scenario ①, and an Remote Direct Memory Access (RDMA) technology may be used in the scenario ④. Compared with the TCP/IP protocol, these technologies can reduce a processing latency at a data server end in network transmission.

However, the plurality of transmission technologies may replace each other. Applications deployed in a node frequently change, and an application needs to communicate with different applications during execution of different tasks. Moreover, these applications have respective life cycles, and run or stop running in response to user operations or received tasks. Therefore, in the prior art, mostly, different transmission protocols are selected in a way that a user analyzes deployment information of applications and then sets a transmission protocol. This greatly increases load of the user, and limits application of a plurality of transmission protocols.

With reference to FIG. 1, the following describes a schematic diagram of a system to which an application interaction method in the embodiments of the present invention is applicable. It should be understood that for ease of description, two DCs are drawn in FIG. 1 for illustration.

In this scenario, deployment manners of microservice applications are quite diversified. A DC 1 and a DC 2 are two data centers, and may be understood as two local area subnets. A plurality of physical machines may be deployed in both of the two data centers, and the plurality of physical machines may be servers, terminals, or network communications devices on which applications can run. For ease of description, only three physical machines in the DC 1 and one physical machine in the DC 2 are drawn in FIG. 1. Two virtual machines run on a physical machine 1 in the DC 1, where a container 11 and a container 12 run on a virtual machine 11, an application 111 and an application 112 run in the container 11, and an application 113 runs in the container 12; and a container 13 runs on a virtual machine 12, and an application 121, an application 122, and an application 123 run in the container 13. A virtual machine 21 runs on a physical machine 2 in the DC 1, where a container 21 and a container 22 run on the virtual machine 21, an application 211 and an application 212 run in the container 21, and an application 213 runs in the container 22. A container 31 and a container 32 run on a physical machine 3 in the DC 1, where an application 311 and an application 312 run in the container 31, and an application 313 runs in the container 32. A physical machine 4 runs in the DC 2, where an application 411 runs on the physical machine 4.

FIG. 1 describes a situation in which virtual machines run on physical machines and containers and applications run on the virtual machines. This situation is common in current cloud scenarios. In a cloud scenario, a user is allowed to lease some hardware devices (such as servers) of a manufacturer, and use hardware resources of the manufacturer to support requirements of the user. Because different users need different hardware resources, one hardware device may be leased to a plurality of users for use, while hardware resources are still managed by the hardware device manufacturer. In this case, a server can be virtualized into a plurality of virtual machines, so that different users use different virtual machines that have independent operating systems. Moreover, the manufacturer can set a user permission, so that a user cannot directly install an application in an operating system of a physical machine. It is possible that different applications in the DC 1 and the DC 2 all need to access each other. For example, in the foregoing architecture, the application 211 is a MySQL database application on a node and provides database access and operation services. The application 112 is a webServer for user access, and provides web services for users in a wide area network. The application 111 is a webServer traffic control application configured to control traffic between the webServer and users. The application 113 and the application 313 are proxies deployed in different physical machines, and are configured to provide proxy services, specifically, for example, filter and identify user data. The application 411 is a web client running on a physical machine in another local area network. The application 112 and the application 113 are located in different containers virtual machines in a same physical machine, and network communication between the two applications belongs to the scenario ① or ③. The application 111 and the application 112 are located in a same container in a same physical machine, and network communication between the two applications belongs to the scenario ②. The application 113 and the application 311 are deployed in different physical machines in a same data center, and network communication between the two applications belongs to the scenario ④. The application 311 and the application 313 are deployed in different containers in a physical machines, and network communication between the two applications belongs to the scenario ⑤.

An embodiment of this application provides an application interaction method. An information transmission mode more suitable for two applications that need to communicate with each other is selected for the two applications by using a transmission mode selection policy and a determined deployment relationship between the two applications that need to communicate with each other, or by using a transmission mode selection policy and determined deployment information of the two applications that need to communicate with each other. In this way, an information transmission mode can be more flexibly configured for applications that need to communicate with each other, to improve information transmission performance. A transmission configuration module and a global configuration node are deployed for implementing the method. A function of the transmission configuration module includes determining a transmission mode for a connection based on a first instruction that may be obtained through processing. Specifically, the first instruction may be a connection request delivered to a peer end (the peer end is the other end of a to-be-established connection) by an application that intends to establish the connection; may be a write instruction sent to a storage unit (for example, a memory or an I/O device) by an application that intends to transmit data; or may be a query instruction that is generated from the connection instruction or the write instruction through processing by an API interface layer. In some cases, the transmission configuration module needs to requests information from the global configuration node, to determine the transmission mode for the connection. It should be understood that in a C/S architecture, generally an end initiating a connection request is also an end requesting a service, that is, a client; an end receiving the connection request is also an end providing the service, that is, a server.

It should be understood that the transmission configuration module is a functional name, and a function of the transmission configuration module may be implemented by using a thread, a process, a container, a virtual machine, or another structure that can implement the function of the module. A process is used as an example for description in this embodiment of this application.

It should be understood that deployment information of an application may be used to determine a location of a node in which the application is located. The location may be an actual physical position, may be a location in a communications network, or may be information that can be used to determine, based on deployment information of two applications, a location relationship between nodes in which the two applications are located. Alternatively, deployment information of an application is identity information of the application such as an ID or a sequence number. For example, in a software-defined networking scenario, a user may design and prestore a transmission mode selection policy provided that the transmission mode selection policy includes a correspondence between identity information of two applications that need to communicate with each other and a transmission mode between the two applications.

Content of different deployment information needs to match content of corresponding transmission mode selection policies, to implement the method described in this application. Deployment information may include at least one of the following types of information. 1. Address information of a node in which an application is located, for example, at least one of address information of a virtual machine in which the application is located, address information of a container in which the application is located, or address information of a physical machine in which the application is located. The address information may be a physical address (e.g., a media access control or MAC address), an IP address, or actual geographical location information of a node (for example, a machine location in an equipment room of a data center in a city). 2. Identity information of an application and identity information of a node in which the application is located, for example, an identifier of the application and an identifier (such as an ID) of the node in which the application is located. 3. Network information of an application and network information of a node in which the application is located, for example, at least one of address information (such as an IP address) or port information listened by the application, information about a port used by the application, an IP address, a subnet mask, a gateway address, information about a network segment in which a virtual machine or a container is located, a virtual local area network (VLAN) ID corresponding to the application (such as a VLAN ID of a virtual machine or a container in which the application is located, and a VLAN address corresponding to the application (such as a VLAN address of the virtual machine or the container in which the application is located). For example, in a cloud scenario or a virtualization scenario, an address or a location of the node is unknown, but the location of the node in which the application is located can be determined by using the network information of the application, the network information of the node in which the application is located, and the identity information of the application or the identity information of the node in which the application is located.

In another embodiment, deployment information of an application may further include service information of the application, so that a service relationship between nodes in which two applications are located can be determined based on deployment information of the two applications. Such service information is, for example, pod information of a container. Pod information of containers can reflect a service association between containers, that is, a service relationship between the containers. Containers that belong to a same pod are configured to carry applications executing a same task or a same type of task. For example, one pod may include a system container and a user container.

It should be understood that in some implementations, a deployment relationship between two applications, that is, a location relationship between nodes in which the two applications are located, may be determined based on deployment information of the two applications. The location relationship between the two nodes is used to indicate a location relationship between the two nodes in a communications network. In other words, only relative locations of the two nodes need to be determined, and specific locations of the two nodes do not need to be considered. The location relationship may also be understood as the different deployment scenarios described above. For example, the two applications may be deployed in a same node, different nodes in a same physical machine or virtual machine, different nodes in a same trusted domain, different nodes in different trusted domains, or nodes in different local area networks.

It should be understood that the transmission mode selection policy mentioned in this embodiment of this application includes at least one of the following correspondences: a correspondence between different deployment relationships and transmission modes, and a correspondence between deployment information of different applications and transmission modes. If the transmission mode selection policy includes the correspondence between different deployment relationships and transmission modes, a correspondence between transmission modes and deployment information of a large quantity of applications that change frequently in a network can be abstracted as a correspondence between several deployment relationships (or deployment scenarios) and transmission modes. For the transmission configuration module, such a correspondence is easier to maintain, and the transmission configuration module is more lightweight and can occupy fewer storage resources. However, the transmission configuration module is required to have a processing capability of determining, based on found deployment information of applications, a deployment relationship between two applications that need to interact with each other. In contrast, if the transmission mode selection policy includes the correspondence between deployment information of different applications and transmission modes, such a correspondence needs to be maintained by using many storage resources, because it is equivalent to establishing a correspondence for every two applications that may communicate with each other. However, it should be understood that such a correspondence may be used in, for example, a software-defined networking scenario. To be specific, when deploying applications, a user or an administrator defines a transmission mode between applications, and stores the correspondence into a corresponding storage device or storage unit, so that the transmission configuration module queries for or reads the correspondence. In addition, resources in an existing database technology can also support storage of such a correspondence. Therefore, allocating a considerable quantity of storage resources for such a correspondence is tolerable in some scenarios.

In an embodiment, the transmission mode selection policy is stored in a node in which the transmission configuration module is located. In another implementation, the transmission mode selection policy may be stored in a storage unit that can be queried or accessed by the transmission configuration module. For example, the transmission mode selection policy and the transmission configuration module are in a same node or different nodes. In other words, a second storage module and a third storage module mentioned below may be in a same virtual machine as the transmission configuration module (in this case, the second storage module and the third storage module may be considered as virtual storage devices or units); may be only in a same physical machine as the transmission configuration module (in this case, the second storage module and the third storage module may be considered as physical storage devices or units); or even may not be in a same physical machine as the transmission configuration module, but the transmission configuration module has a permission of remote direct access.

In another embodiment, a default transmission mode selection policy prestored in a node may be used. To ensure an effect and implementation, a transmission mode included in the default transmission mode selection policy needs to be supported by an operating system of an application, or may be configured by a tenant based on a requirement or a transmission scenario. It should be understood that, to ensure that an appropriate transmission mode is selected for an application interaction process, a tenant needs to complete configuration before the application interaction. The transmission mode selection policy usually includes a plurality of transmission modes. Certainly, in an initial state, prestored transmission mode selection policies may include a unified default initial transmission mode, to make it convenient for the tenant to perform modification and addition. For example, the transmission mode in the transmission mode selection policy includes at least one of the TCP/IP, the UDP, RDMA, memory sharing, interprocess communication (Domain_Socket), and other possible communications technologies.

For example, the following provides solutions for one transmission mode selection policy.

1. A memory sharing transmission mode is used for applications that are deployed in a same pod in a same host (a set of associated containers for a same tenant and a same service is referred to as a pod).

2. Domain-socket domain communication (an interprocess communication mode) is used for applications that are deployed in different pods in a same host.

3. An RDMA transmission-channel transmission mode is used for applications that are deployed in different hosts in a same data center (DC).

4. Multipath TCP or QUIC protocol multipath transmission is used for applications that are deployed in different DCs.

5. The standard TCP/IP mode is used for an unidentifiable deployment relationship.

It can be learnt that this example describes a correspondence between transmission modes and deployment relationships between applications. In the foregoing several solutions, a deployment relationship between applications is mainly represented a by location relationship between nodes in which two applications are located, with a service relationship between the nodes in which the applications are located considered.

It can be learnt that the transmission configuration module and the global configuration node that are provided in this embodiment of the present invention are also included in FIG. 1.

As shown in FIG. 1, the transmission configuration module can run in an operating system (OS) of a physical machine, run in an operating system of a virtual machine, or even run in a container. It should be noted that, although a container is not entirely independent of an operating system of a host, a container technology enables a container to have a virtual operating system layer for use by the container. The operating system layer may also be considered as a duplicate of an operating system of a host in which the container is located, and is used to provide an application running in the container, so that the container can be separated from the operating system of the host. It may be considered that the application in the container runs in the operating system layer of the container.

For ease of description, physical machines, virtual machines, containers, and other apparatuses that have operating systems and can perform communication may be collectively referred to as nodes.

In another aspect, an embodiment of this application does not limit a specific manner of deployment of the transmission configuration module in a node. After deployment, it is unnecessary to frequently change a location of the transmission configuration module or restart the transmission configuration module. The transmission configuration module may store deployment information of applications and the transmission mode selection policy based on a storage resource such as a memory or a hard disk of a node. This application file does not limit how the transmission configuration module is deployed in a network. To be specific, a quantity of nodes and specific nodes in which the transmission configuration module runs are not limited. An implementation solution can be flexibly set. Major considerations are impact of the implementation solution on efficiency of implementing the application interaction method described in this application file, to be specific, a delay caused during a connection establishment process by determining of a transmission mode in execution of the application interaction method, and operating system resources occupied by the implementation solution. Specifically, a smaller quantity of transmission configuration modules distributed in nodes indicates a larger amount of deployment information of applications in the nodes that needs to be managed by each transmission configuration module. This increases load of transmission between the nodes, and prolongs a time for determining a transmission mode. For example, the transmission configuration module may need to manage deployment information of cross-node applications, and information collection in this case also involves communication between two applications. The TCP/IP protocol is used by default in this process. In contrast, a larger quantity of transmission configuration modules distributed in nodes indicates more occupied operating system resources and hardware resources of the nodes, increasing system overheads. In addition, more transmission configuration modules indicate more frequent interaction with the global configuration node. Because the global configuration node runs in a relatively complex environment and is usually deployed in a global network, and communication of the global configuration node with the transmission configuration modules crosses local area networks, this interaction affects reliability of the local area networks. Therefore, deployment of transmission configuration modules can be comprehensively determined based on network reliability, system overheads of nodes, and method implementation efficiency.

In other words, for example, one transmission configuration module may run on each physical machine in which applications that need to communicate with each other are deployed. The transmission configuration module manages the physical machine, virtual machines running on the physical machine, and applications running in containers. Alternatively, one transmission configuration module may manage deployment information of applications in a plurality of physical machines. In other words, the transmission configuration module runs on some physical machines. Similarly, one transmission configuration module may run on each virtual machine in which applications that need to communicate with each other are deployed, or one transmission configuration module may run on some virtual machines. Certainly, some transmission processes may alternatively be deployed in virtual machines, and some are deployed in containers.

The global configuration node is also a node, and this node may be a server. Actually, a server is used as an example in an implementation of this application, and the global configuration node is a functional name. The global configuration node stores deployment information of applications running in nodes within a network area that can be covered (for example, a service can be provided) by the global configuration node, and the deployment information may be managed by a process, an application, a container, or a virtual machine. In other words, the global configuration node may maintain deployment information of applications within a network area (for example, a global network, "global" for short). Therefore, the global configuration node may be any physical machine, virtual machine, or container provided that this function can be implemented. The node may be in a global network or a local area network. When the node is a physical machine, the physical machine may run virtual machines and containers. The physical machine may also run applications other than the application managing deployment information. A transmission configuration module may also be deployed in the physical machine, or a process or an application that maintains deployment information of global applications may be used as a transmission configuration module in the physical machine. Certainly, the global configuration node may alternatively be any node within the network area. The node may run applications other than the application managing deployment information. In other words, a physical machine may be both a global configuration node and a service node in which applications executing services run. Certainly, the global configuration node generally does not overlap a service node. This is because the global configuration node undoubtedly attaches more importance to a storage capacity but a common service node cares more about a processing capability. Their requirements for hardware also differ.

Figure 2:
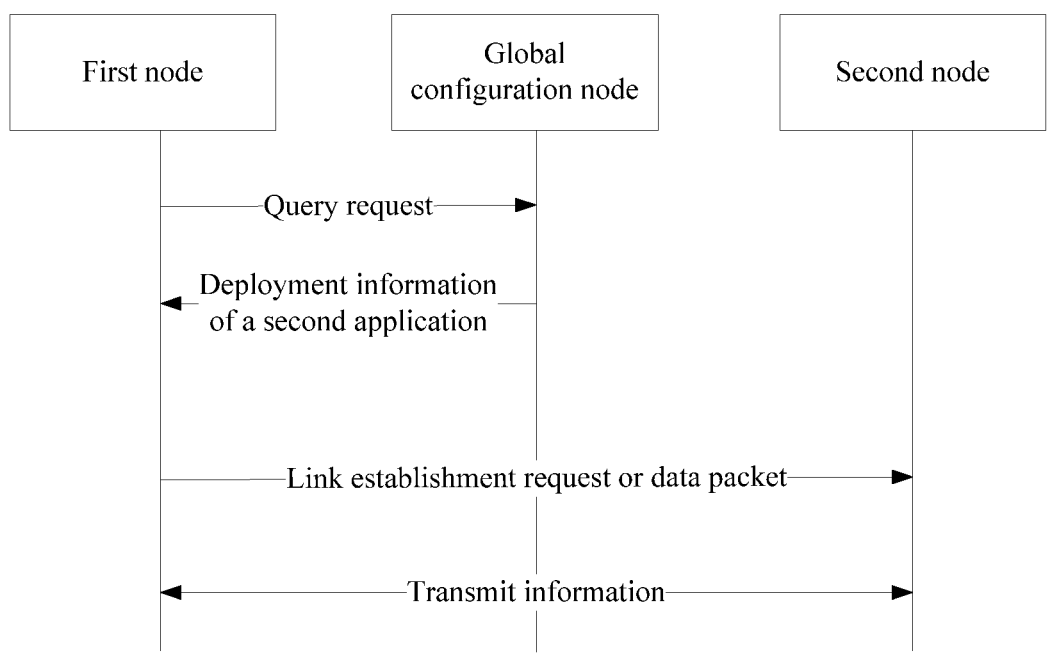
FIG. 2 is a schematic interaction diagram of an application interaction system according to an embodiment of the present invention.

The following describes an application interaction system with reference to FIG. 2. The system includes the foregoing global configuration node, a first node in which a first application runs, and a second node in which a second application runs. The global configuration node is configured to store deployment information of a plurality of applications running in the application interaction system, where the deployment information includes locations of nodes in which the applications are located. FIG. 2 shows an interaction process between the three nodes.

The first node is configured to send a query request to the global configuration node based on a connection instruction or a write instruction of the first application, where the connection instruction indicates that the first application requests to establish a connection to the second application, the write instruction indicates that the first application instructs to write, into a first storage unit, information that is to be transmitted to the second application, and the query request is used to query for deployment information of the second application.

The global configuration node is configured to send found deployment information of the second application to the first node based on the query request.

The first node is configured to determine an information transmission mode between the first application and the second application based on deployment information of the first application, the deployment information of the second application, and a transmission mode selection policy, where the transmission mode selection policy includes a correspondence between the deployment information of the first application and the transmission mode and a correspondence between the deployment information of the second application and the transmission mode, or the transmission mode selection policy includes a correspondence between the transmission mode and a deployment relationship between the first application and the second application, and the deployment relationship between the first application and the second application includes a relationship between a location of the first node and a location of the second node.

The first node is configured to send a link establishment request or a data packet to the second node, where the link establishment request is obtained by processing the connection instruction based on the transmission mode, and the data packet is obtained based on the transmission mode and the write instruction.

The second node is configured to determine the transmission mode based on the received link establishment request or the received data packet.

The first node and the second node use the transmission mode to transmit information.

It should be understood that the first application delivers the connection instruction or the write instruction. The connection instruction indicates that the first application requests to establish a connection to the second application, and the write instruction indicates that the first application writes, into the first storage unit, information that is to be transmitted to the second application. The connection instruction may include information about the first application and information about the second application. The write instruction may include the information to be written by the first application and an identifier of a storage unit into which the information is to be written. The information about the first application may include an identifier of the first application, where the identifier may be any information used to represent the first application, for example, at least one of an ID and a source address. The information about the second application may include an identifier of the second application, where the identifier may be any information used to represent the second application, for example, at least one of an ID and a destination address. For details, refer to the deployment information described above.

It should be noted that the second node receives the connection request or the data packet sent by the first node. In one manner, the second node may determine a transmission mode between the second node and the first node based on an encapsulation format of the connection request or the data packet. This manner requires that connection requests or data packets in different transmission modes have different encapsulation formats. In another manner, the second node may determine information about the first node (for example, an identifier) based on the connection request or the data packet, and determine a transmission mode between the first node and the second node based on the information about the first node and information about the second node by using a transmission configuration module in the second node.

It should be understood that, in an implementation, in the system shown in FIG. 2, the deployment information of the second application is not stored in a first physical machine in which the first node is located. In addition, in this implementation, the global configuration node and the first physical machine are different physical machines, and the first physical machine and a second physical machine in which the second node is located are different physical machines. However, FIG. 2 only shows one implementation of the system described above. For example, the global configuration node and the second node are drawn as two blocks in FIG. 2, but the global configuration node and the second physical machine may be a same physical machine. Actually, in implementation, two of the first node, the second node, and the global configuration node may be configured in one physical machine, or even all of the three nodes may be in one physical machine.

In another embodiment, the global configuration node and the first node may be in a same physical machine, or the first node stores the deployment information of the second application (for example, the first node and the second node are a same node, or the second application once established a connection to an application in the first node). In this case, the first node does not need to query the global configuration node for the deployment information of the second application.

In a case, the first node is configured to determine a communication mode based on the deployment information of the first application, the deployment information of the second application, and the transmission mode selection policy by using a transmission configuration module running in the first node. The transmission mode selection policy includes the correspondence between the deployment information of the first application and the transmission mode and the correspondence between the deployment information of the second application and the transmission mode, or the transmission mode selection policy includes the correspondence between the transmission mode and the deployment relationship between the first application and the second application, and the deployment relationship between the first application and the second application includes the relationship between the location of the first node and the location of the second node. It should be understood that the first node needs to store the transmission mode selection policy.

Therefore, a node in which an application requesting connection establishment is located can determine, based on deployment information of two applications that need to interact with each other and the transmission mode selection policy, a transmission mode between the two applications that need to interact with each other. In this way, an appropriate transmission mode can be selected more flexibly, so that the selected transmission mode matches deployment of the two applications better. This improves transmission performance such as data transmission efficiency, and avoids an unnecessary waste of transmission resources and a drop in data transmission efficiency that are caused by usage of an inappropriate transmission mode during an information transmission process.

It should be understood that deployment information of applications maintained by the global configuration node is sent by nodes within a coverage area of the global configuration node to the global configuration node. Therefore, information about the applications running in the nodes within the coverage area is registered with the global configuration node. In an implementation, a node in which a transmission configuration module is deployed sends deployment information of an application obtained by the transmission configuration module to the global configuration node.

In other words, the first node is further configured to send the deployment information of the first application to the global configuration node, so that the deployment information of the first application is registered with the global configuration node. The second node is further configured to send the deployment information of the second application to the global configuration node, so that the deployment information of the second application is registered with the global configuration node.

In this way, the first physical machine and the second physical machine need to learn only deployment information of applications in respective corresponding nodes, reducing load of deployment information maintenance. The first physical machine and the second physical machine send the deployment information of the applications to the global configuration node. This facilitates management and ensures real-time deployment information of the applications.

Various terms and corresponding technical details in the described application interaction system include but are not limited to transmission mode, deployment information, and transmission mode selection policy. For these, refer to the foregoing descriptions. Details are not described herein again.

It may be considered that the global configuration node and the transmission configuration modules constitute a system for managing deployment information of applications in a network. It should be understood that in the system to which the method described in this embodiment of this application is applicable, there is no definite essential difference between the transmission configuration module and the global configuration node in the sense of maintaining deployment information of applications. It should be understood that the global configuration node is not required to store deployment information of all applications in an actual networking system, or deployment information of all applications in a network covered by the global configuration node. For example, some applications in the system do not need to communicate. Moreover, there may be one or more global configuration nodes in a network system in this embodiment of this application, where each global configuration node manages deployment information of applications in some nodes in the network.

As described above, the function of the transmission configuration module includes obtaining a first instruction, and the transmission configuration module can determine a transmission mode for a connection by processing the first instruction. The first instruction may be the foregoing connection instruction or write instruction, or may be a query instruction generated based on the connection instruction or the write instruction, where the query instruction is used to query for deployment information at a source end and a peer end. The foregoing function can be implemented because the transmission configuration module determines, based on information in a connection request, the deployment information of applications at the source end and the peer end that are related to the connection request, and even can determine a deployment relationship between the applications at the source end and the peer end based on the deployment information, to determine a transmission mode based on the deployment information at the source end and the peer end and the transmission mode selection policy, or based on the deployment relationship and the transmission mode selection policy. This requires that the transmission configuration module be capable of obtaining the deployment information of the applications at the source end and the peer end.

Figure 3:
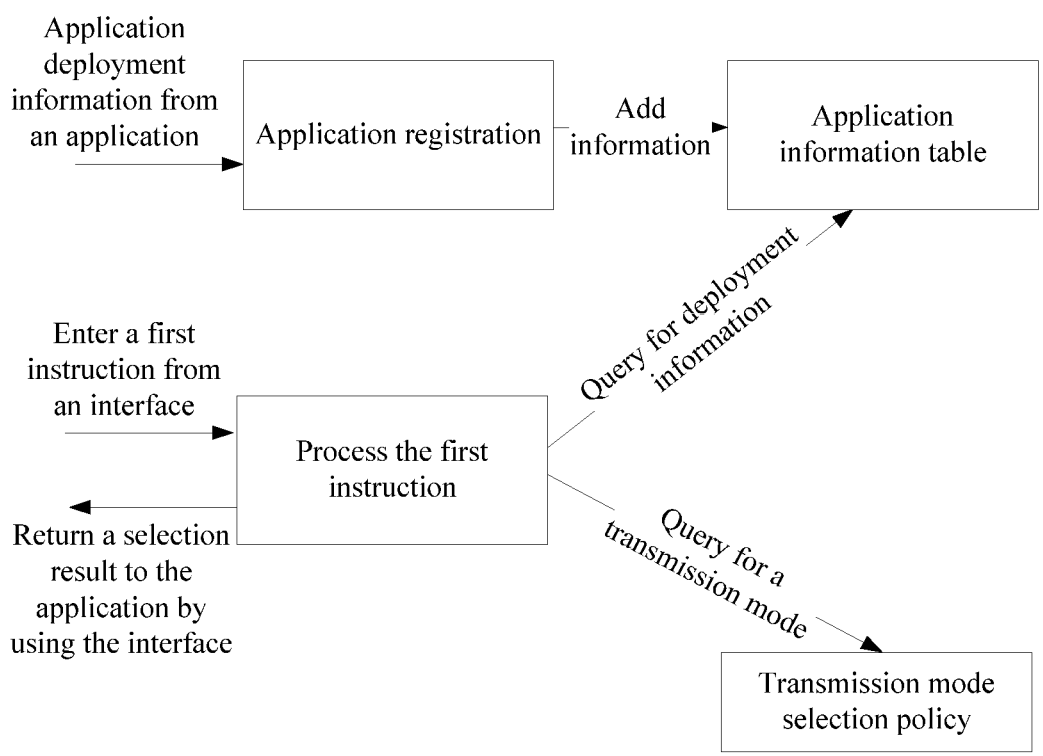
FIG. 3 is a schematic diagram of processing received information by a transmission configuration module according to an embodiment of the present invention.

The following describes, with reference to FIG. 3, a process in an implementation in which a running application registers with a transmission configuration module and the transmission configuration module determines a transmission mode after obtaining a connection request. It should be understood that FIG. 3 is only a schematic diagram. It should be understood that both the source end and the peer end need to complete the process in which a running application registers with a transmission configuration module (actually, during the registration process, whether the running application is a connection initiation party or a connection request receiving party is unknown), so that a corresponding connection party can be determined during establishment of a connection involving the applications. For example, as described above, in this embodiment of this application, when a deployment relationship between two applications establishing a connection cannot be determined, the TCP/IP protocol is used by default. To be specific, to implement the method in this embodiment of this application, information about applications in interaction needs to be registered before an application initiates a connection request. In other words, in a C/S architecture, both a server and a client need to perform registration.

As shown in FIG. 3, registration with the transmission configuration module by the running application is specifically completed by sending deployment information of the application to the transmission configuration module. As described above, the deployment information may include, for example, at least one of address information of a node in which the application is located, identity information of the application and identity information of the node in which the application is located, network information of the application and network information of the node in which the application is located, and location information of the application and location information of the node in which the application is located. In a case, the deployment information may further include service information of the node in which the application is located. A specific form of the deployment information is not limited in this embodiment of this application. The transmission configuration module stores a mapping relationship between an identifier of the application and the deployment information of the application, to complete registration. For example, the mapping relationship may be an application information table. The identifier of the application is used to represent the application and is usually in a form commonly used by the application to establish a connection, for example, may be an ID of the application, a source address corresponding to the application, or a port corresponding to the application. This is not limited in this embodiment of the present invention.

In another aspect, after obtaining a first instruction, the transmission configuration module queries for the deployment information of the application and the deployment information of the application at the peer end based on information about the application and information about the connected peer end that are carried in the first instruction (for example, identifiers of the two applications and a destination address of the application at the peer end; no limitation is imposed in this embodiment of this application). In this way, the transmission configuration module can determine the transmission mode for the connection based on the configuration information and a preset transmission mode selection policy; or determine a deployment relationship between the application and the application at the peer end based on the configuration information, and determine the transmission mode for the connection based on the deployment relationship and a preset transmission mode selection policy. In an implementation, the deployment information of the application at the peer end needs to be obtained by querying the global configuration information. The transmission configuration module may store the obtained deployment information of the application at the peer end into a third storage module (which may be in a node in which the transmission process is located or in a physical machine corresponding to the node), to facilitate later use. In an implementation, the transmission configuration module may return the determined transmission mode to the application delivering the connection request.

It should be understood that the stored information related to the transmission configuration module, for example, the deployment information of the application and a preset storage policy, may be stored in a second storage module and the third storage module. The second storage module and the third storage module may be a same memory or different memories. For example, the second storage module is configured to store deployment information of an application in a same node or a same physical machine as the transmission configuration module, and the third storage module is configured to store deployment information of an application in another node. This is not limited in this application file. The second storage module and the third storage module are storage devices or storage units that can be accessed by the transmission configuration module. For example, the second storage module and the transmission configuration module may be in a same node or in different nodes in a same physical machine, or the second storage module may be in another physical machine to which the transmission configuration module has remote direct access. A similar case applies to the third storage module. Further, for the related description of a relationship between a location of stored deployment information and a location of a transmission configuration module, refer to the foregoing related content. Specific forms of the second storage module and the third storage module are not limited in this application file. For example, the second storage module and the third storage module may be in a cache corresponding to the transmission configuration module or in a hard disk, or may be in local storage space that another transmission configuration module has a permission to access.

It should also be noted that an application exchanges information with a transmission configuration module by using an API (application programming interface). For example, the API may be a set of interface functions of a socket. The set of interface functions includes a function socket ( ). In a general technology, socket ( ) is the first function in this set of functions. The API may be developed by a user, or may be obtained through improvement based on a prior-art API. Because no transmission configuration module is configured in the prior art, an application surely cannot interact with a transmission configuration module by using an interface function. In this case, an implementation method is modifying interface functions of a socket and using a redefined API. However, this is incompatible with the prior-art API and is inapplicable to an existing application version. To make the existing application version support the redefined API, applications need to be modified or a user operating applications needs to program code for the applications. This is obviously inconvenient, and causes a huge increase to development costs.

Therefore, in an implementation, a function library corresponding to the set of interface functions of the socket may be modified but forms of the interface functions are not changed. Specifically, content in the function library may be modified, or interface functions of the socket may be redirected to the modified function library (that is, the interface functions are redirected to a storage location of the modified function library). For example, the modified function library may be used to overwrite the original function library corresponding to the socket functions, or the modified function library may be stored into an operating system directory at a higher loading level, so that the interface functions call code in the modified function library during an execution process, to implement a function different from an original function. In this way, for an application, interface functions for use are not changed, but the improved library called by the interface functions changes the function of the interface functions. In other words, a connection request is handed over to the transmission configuration module for processing.

In addition, the transmission configuration module needs to determine an appropriate transmission mode, so that the connection request can continue to be delivered by using a protocol interface corresponding to the transmission mode. Therefore, nodes in this embodiment of this application need to support a plurality of transmission protocol interfaces, that is, interfaces used for implementing a plurality of transmission modes are configured. Secondary development and maintenance on applications by a programmer are inevitable during deployment and running of the applications, or different application versions may support different interface forms, or interfaces in some nodes are not standard interfaces. Therefore, in an implementation, to screen differences between the plurality of interfaces specific to applications at an application layer so that development of application programs at an upper layer becomes simpler and quicker, an interface adaptation layer may be configured in a socket for the applications. For example, specifically a function pointer may be used to connect interfaces in different technologies to interfaces in a unified form.

It should be understood that the socket for the applications and the interface adaptation layer may be considered as a part of underlying code of the applications. To be specific, the socket functions of the applications are underlying functions of the applications, and a person skilled in the art should know that the applications are unaware of calls for the underlying functions of the applications. Functionally, the socket, the function library corresponding to the socket, and the optional interface adaptation layer mentioned above may be considered as modules configured to determine a transmission mode that are provided in this embodiment of this application, that is, an instruction transmission module in an apparatus mentioned below. For example, the instruction transmission module may be referred to as an nSocket module.

An embodiment of this application further provides an application interaction method. The following describes the method with reference to an interaction process between a first application and a second application in FIG. 4. In the embodiment corresponding to FIG. 4, the first application and a transmission configuration module are located in a same physical machine. For terms in the method that have been described above, refer to the foregoing descriptions, for example, identifier, transmission configuration module, first instruction, deployment information, deployment relationship, interface function, and transmission mode selection policy.

Block S401. The transmission configuration module receives a first instruction, where the first instruction includes an identifier of the first application and an identifier of the second application.

For descriptions of the identifiers, refer to the foregoing descriptions.

In an implementation, the first instruction is a query instruction, and the query instruction is used to query for deployment information of the first application and deployment information of the second application, or the query instruction is used to query for a deployment relationship between the first application and the second application, or the query instruction is used to query for a transmission mode between the first application and the second application.

In other words, the query instruction is only required to make the transmission configuration module finally determine the transmission mode between the two applications, but information used for query in the query instruction may be information related to the transmission mode.

Correspondingly, the receiving, by the transmission configuration module, a first instruction includes:

receiving, by the transmission configuration module, the query instruction by using a first interface function of a socket, where content of a function library called by the first interface function is set to being used to process a connection instruction or a write instruction delivered by the first application into the query instruction, and send the query instruction to the transmission configuration module for processing to determine the transmission mode; the connection instruction indicates that the first application requests to establish a connection to the second application, and the write instruction indicates that the first application instructs to write, into a first storage unit, information that is to be transmitted to the second application.

In one embodiment, the transmission configuration module may alternatively receive the query instruction by using another API interface. However, a function of the API interface is similar to that of the first interface function. For example, a self-defined interface is used instead of a default protocol port, or a form of a prior-art interface is changed. Then, the first application and an operating system running the first application need to be programmed, to change a processing process on a connection request delivered by the first application in the prior art. In this way, the connection request is processed by the transmission configuration module to determine an appropriate transmission mode.

It should be understood that what the first application delivers is the connection instruction or the write instruction. In this case, the interface function or another interface needs to be capable of processing the connection instruction or the write instruction into the query instruction, to facilitate use by the transmission configuration module. In this way, the transmission configuration module has a relatively monotonous function and is relatively lightweight, and no complex processing is required. In contrast, improvement of the API is more complex.

In another implementation, the first instruction is a connection instruction or a write instruction delivered by the first application, the connection instruction indicates that the first application requests to establish a connection to the second application, and the write instruction indicates that the first application instructs to write, into a first storage unit, information that is to be transmitted to the second application.

Correspondingly, the receiving, by the transmission configuration module, a first instruction includes: receiving, by the transmission configuration module, the connection instruction or the write instruction by using a first interface function of a socket, where content of a function library called by the first interface function is set to being used to send the connection instruction or the write instruction delivered by the first application, to the transmission configuration module for processing to determine the transmission mode.

It should be understood that in the foregoing two implementations, a form of the first interface function is the same as that of an interface function in the prior art, but the content of the function library called by the interface function has been modified. For a specific implementation, refer to the foregoing descriptions. In this case, an upper-layer application such as the first application is unaware of the interface change, and the upper-layer application does not need to change to adapt to the interface. The form of the first interface function is the same as that of the interface function in the prior art, but a function of the first interface function has changed. For example, the interface function is still connect ( ). In this way, compatibility with prior-art interface functions of the socket is maintained, and the first application and a user using the first application are unaware of a change in processing of the connection request. Therefore, more convenience and better applicability are achieved.

Certainly, in an embodiment, the transmission configuration module may alternatively receive the connection instruction or the write instruction by using another API interface. However, a function of the API interface is similar to that of the first interface function. For example, a self-defined interface is used instead of a default protocol port, or a form of a prior-art interface is changed. Then, the first application and an operating system running the first application need to be programmed, to change a processing process on a connection request delivered by the first application in the prior art. In this way, the connection request is processed by the transmission configuration module to determine an appropriate transmission mode.

It should be understood that what the first application delivers is the connection instruction or the write instruction. In this case, it is equivalent to that the interface only performs forwarding, and what the transmission configuration module receives is also the connection instruction or the write instruction. The transmission configuration module needs to be capable of processing the connection instruction or the write instruction into a query instruction, so as to determine the transmission mode. In this case, functions of the transmission configuration module are relatively diversified, and specific instruction conversion and analysis capabilities are required. In contrast, improvement of the API is simpler.

For example, the connection instruction includes an ID of the first application or a source address corresponding to the first application, and an ID of the second application or a destination address corresponding to the second application. The write instruction may include an identifier of the first application, to-be-written data, and a destination address (which may be a destination address of the second application or an I/O device). For specific descriptions of the connection instruction and the write instruction, refer to the foregoing descriptions. In addition, for the write instruction, even in a memory sharing mode, data is stored in a storage unit, and the first application indicates an address of the storage unit by using some information or structures (for example, a pointer), and transmits the pointer to the second application, so that the second application reads the data by using the pointer, and information is shared between the first application and the second application. In this case, data transmitted in the write instruction is the information or structures (for example, a pointer).

It should be understood that the first application may deliver the connection instruction in a scenario in which a default transmission mode for the first application is TCP/IP. The first application may deliver the write instruction in a scenario in which a default transmission mode for the first application is, for example, UDP or memory sharing.

Block S403. The transmission configuration module determines deployment information of the first application and deployment information of the second application based on the first instruction, where the deployment information of the first application includes a location of a first node in which the first application is located, and the deployment information of the second application includes a location of a second node in which the second application is located.

It should be understood that the first node in which the first application is located is usually a node directly carrying the application, but in a policy in which only a granularity of a physical machine is considered in a transmission mode selection policy, the first node may be a physical machine in which the application is located.

In an implementation, the transmission configuration module obtains the deployment information of the first application from a second storage module based on the identifier of the first application; the transmission configuration module obtains the deployment information of the second application from a third storage module based on the identifier of the second application, where the third storage module is a memory that is the same as or different from the second storage module; or when the deployment information of the second application is not stored in the third storage module, the transmission configuration module obtains the deployment information of the second application from a global configuration node based on the identifier of the second application.

For descriptions of the second storage module and the third storage module, refer to the foregoing descriptions.

Therefore, the transmission configuration module may need to obtain information from the global configuration node. In this way, the transmission configuration module does not need to manage deployment information of all applications within a range to which the method is applicable. In such a distributed deployment information management method, updating, management, and exchange of deployment information are simpler, and storage resources are saved.

This application file does not limit a specific method for interaction between the transmission configuration module and the global configuration node, and a plurality of existing technologies are usable, for example, through sending of a query request. For a processing process of the transmission configuration module and its interaction with the global configuration node, refer to the foregoing descriptions.

Block S405. The transmission configuration module determines an information transmission mode between the first application and the second application based on the deployment information of the first application, the deployment information of the second application, and a transmission mode selection policy.

The transmission mode selection policy includes a correspondence between the deployment information of the first application and the transmission mode and a correspondence between the deployment information of the second application and the transmission mode.

Alternatively, the transmission mode selection policy includes a correspondence between the transmission mode and a deployment relationship between the first application and the second application, and the deployment relationship between the first application and the second application includes a relationship between the location of the first node and the location of the second node.

In one embodiment, the transmission mode selection policy is stored in a storage unit corresponding to the transmission configuration module, for example, may be stored in the second storage module and the third storage module mentioned above, or another storage unit. The transmission mode selection policy may include a plurality of correspondences. A specific form of the correspondence is not limited in this embodiment of this application. For example, the correspondence may be a table. For descriptions of the transmission configuration module and the transmission mode selection policy, refer to the foregoing descriptions.

The location of the first node in which the first application is located includes network information of the first application, network information of the first node, or address information of the node in which the first application is located, and the location of the second node in which the second application is located includes network information of the second application, network information of the second node, or address information of the node in which the second application is located. It should be understood that granularities considered for a node in which an application is located are different in different scenarios, especially in a virtualization scenario. Therefore, in different transmission mode selection policies, the first node may be corresponding to different granularities (the first node may be one of a container carrying the first application, a virtual machine carrying the container, or a physical machine carrying the virtual machine or the container. In this case, the location of the first node may be represented by using a plurality of different parameters. A similar case applies to the second node. For specific descriptions, refer to the foregoing descriptions.

The transmission mode includes one of the TCP/IP, the UDP, RDMA, memory sharing, and interprocess communication (Domain_Socket).

Therefore, the location relationship between the first node and the second node that is included in the deployment relationship may be based on a plurality of granularities, for example, a location relationship between physical machines, and a location relationship between virtual machines. A specific granularity may vary with different scenarios and requirements. A service relationship between the two nodes may be further included. When more granularities are considered, a preset transmission mode selection policy usually includes more types of correspondences between deployment relationships and transmission modes, so that a most appropriate transmission mode is selected. It should be understood that content stored in the deployment relationship needs to be negotiated or set in advance in a system using the method.

In one embodiment, the first node is a first container, and the second node is a second container; and the determining, by the transmission configuration module, a transmission mode for information transmission between the first application and the second application based on the deployment information of the first application, the deployment information of the second application, and a transmission mode selection policy includes:

when the first container and the second container are located in a same physical machine and the first container and the second container belong to a same pod, determining, by the transmission configuration module, that the transmission mode for information transmission between the first application and the second application is memory sharing; or when the first container and the second container are located in a same physical machine and the first container and the second container belong to different pods, determining, by the transmission configuration module, that the transmission mode for information transmission between the first application and the second application is interprocess communication (Domain_Socket).

It should be understood that, after the transmission configuration module determines the transmission mode, the connection instruction or the write instruction used as the first instruction may be further distributed to an interface corresponding to the corresponding transmission mode for processing, for example, sent to a target device (for example, an I/O device or a storage device), or sent to a target node.

For example, if the transmission mode determined by the transmission configuration module is using the TCP/IP protocol for transmission, the node in which the first application is located (the node is deployed in a first physical machine) encapsulates the connection instruction as a link establishment request by using the TCP/IP protocol, and sends the link establishment instruction to the second application, that is, to a second physical machine in which the second application is located.

In one embodiment, after receiving the link establishment request, the second application sends a response packet to the first application, where the response packet is a TCP/IP packet. To be specific, the second application determines the transmission mode for the connection based on a format of the received link establishment request, and returns the response packet by using the same communications protocol as is used for the link establishment request. Afterwards, the TCP/IP protocol is also used for transmitting information, for example, service data, between the first application and the second application.

Block S407. The first application uses the transmission mode to transmit information to the second application.

It should be understood that the transmitted information may be information that is transmitted to the second application subsequent to the write instruction or the connection instruction. Alternatively, the transmitted information may be the write instruction or the connection instruction, because in the sense of a whole procedure, the write instruction or the connection instruction is delivered to the second application by the first application by using the interface corresponding to the transmission mode.

In one embodiment, the transmission configuration module returns the determined transmission mode to the first application. In this way, during subsequent interaction with the second application, the first application can use the interface corresponding to the transmission mode, and the transmission configuration module no longer needs to make a decision. Certainly, the first application needs to configure a corresponding interface based on the returned transmission mode because the first application supports a plurality of interfaces. In an implementation, the interface is a socket, and therefore the first application configures an interface function of the socket based on the transmission mode returned by the transmission configuration module; and the first application uses the transmission mode to send the information to the second application by using the configured second interface function of the socket.

It should be understood that because interface functions of the socket that are used to send and receive information (mainly data and instructions exchanged) are different in different transmission modes, the first application determines, based on the returned transmission mode, interface functions corresponding to information sending and receiving. The second interface function is a determined function used for information sending.

Therefore, by changing a processing process on the connection request delivered by the application, the transmission configuration module is used to process the first instruction, so that a transmission mode between two applications that need to interact with each other can be determined based on deployment information of the two applications that need to interact with each other and the transmission mode selection policy, and then the transmission mode is used to transmit information. In this way, an appropriate transmission mode can be selected more flexibly. This improves transmission performance such as data transmission efficiency, and avoids an unnecessary waste of transmission resources and a drop in data transmission efficiency that are caused by usage of an inappropriate transmission mode during an information transmission process.

It should be understood that the first application may further register its deployment information with the transmission configuration module, so that the transmission configuration module can manage the deployment information of the first application, for example, store a correspondence between the identifier and the deployment information of the first application. In this way, the deployment information of the first application can be used during determining of transmission modes for other connections related to the first application. Further, the transmission configuration module may further send the deployment information to the global configuration node. Transmission configuration modules distributed in a plurality of nodes and the global configuration node may form a system used to manage deployment information of applications. It should be understood that the TCP/IP protocol is used by default for communication between transmission configuration modules and between a transmission configuration module and the global configuration node in the system.

In another aspect, in the method described in this embodiment of this application, the second application may also send the deployment information of the second application to a transmission configuration module corresponding to the second application, and the transmission configuration module corresponding to the second application may be specifically a transmission configuration module in the node carrying the second application or in the physical machine in which the node carrying the second application is located, so that the transmission configuration module corresponding to the second application manages the deployment information of the second application (for example, stores the deployment information into a corresponding storage unit). Further, the transmission configuration module corresponding to the second application sends the deployment information of the second application to the global configuration node. For other descriptions, refer to the part related to the deployment information of the first application described above.

It should be understood that a plurality of applications are deployed in one node. Therefore, the method and the system in the embodiments of this application may also be applied to scenarios in which a plurality of transmission modes are used for concurrent transmission. To be specific, a plurality of applications in one node may use different transmission modes to perform concurrent communication with peer ends. This can better utilize multipath transmission resources and reduce resource contention on an original default path, thereby allowing more applications to communicate concurrently.

Figure 4:
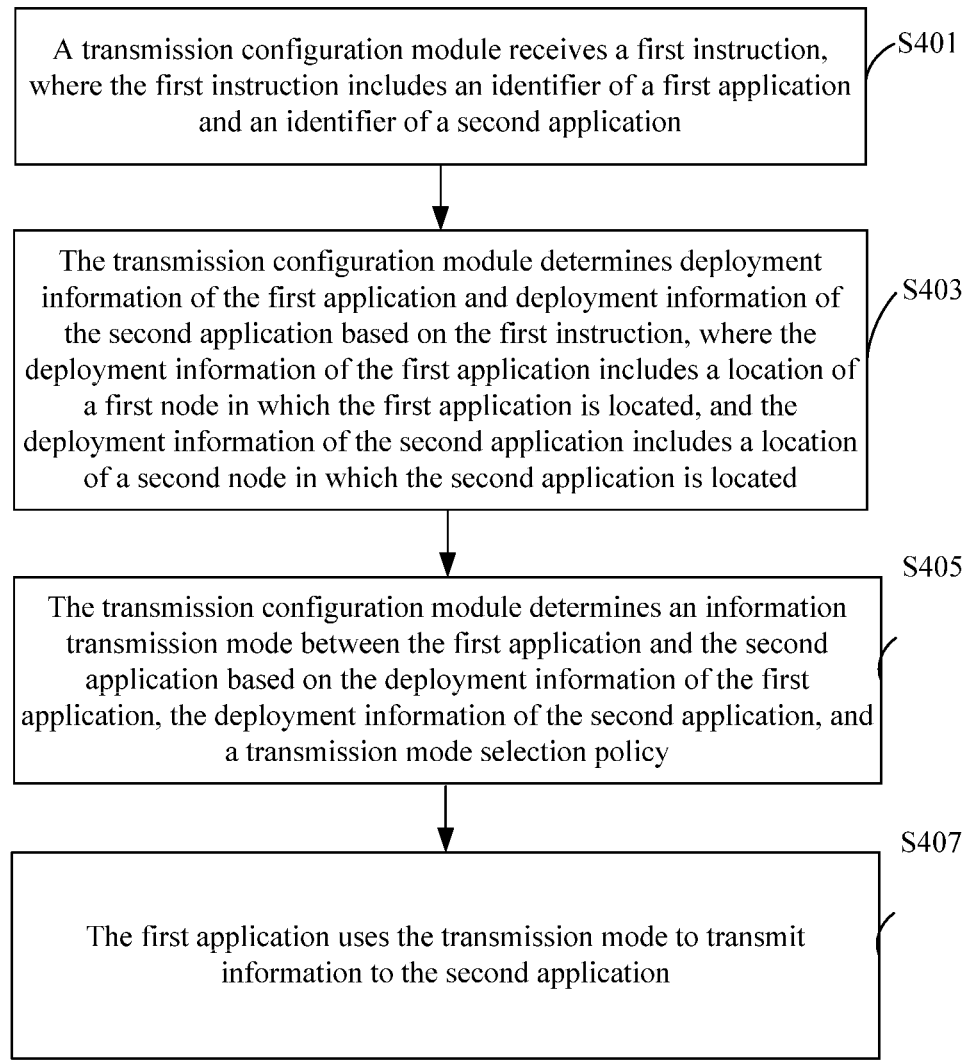
FIG. 4 is a flowchart of an application interaction method according to an embodiment of the present invention.

It should be understood that the socket, the interface functions of the socket, the function library corresponding to the interface function in the embodiment corresponding to FIG. 4 are a part of the foregoing instruction transmission module (that is, an nSocket module).

For other descriptions of the embodiment corresponding to FIG. 4 (for example, descriptions of terms or scenarios mentioned above), refer to the foregoing descriptions. Details are not described herein again.

Figure 5:
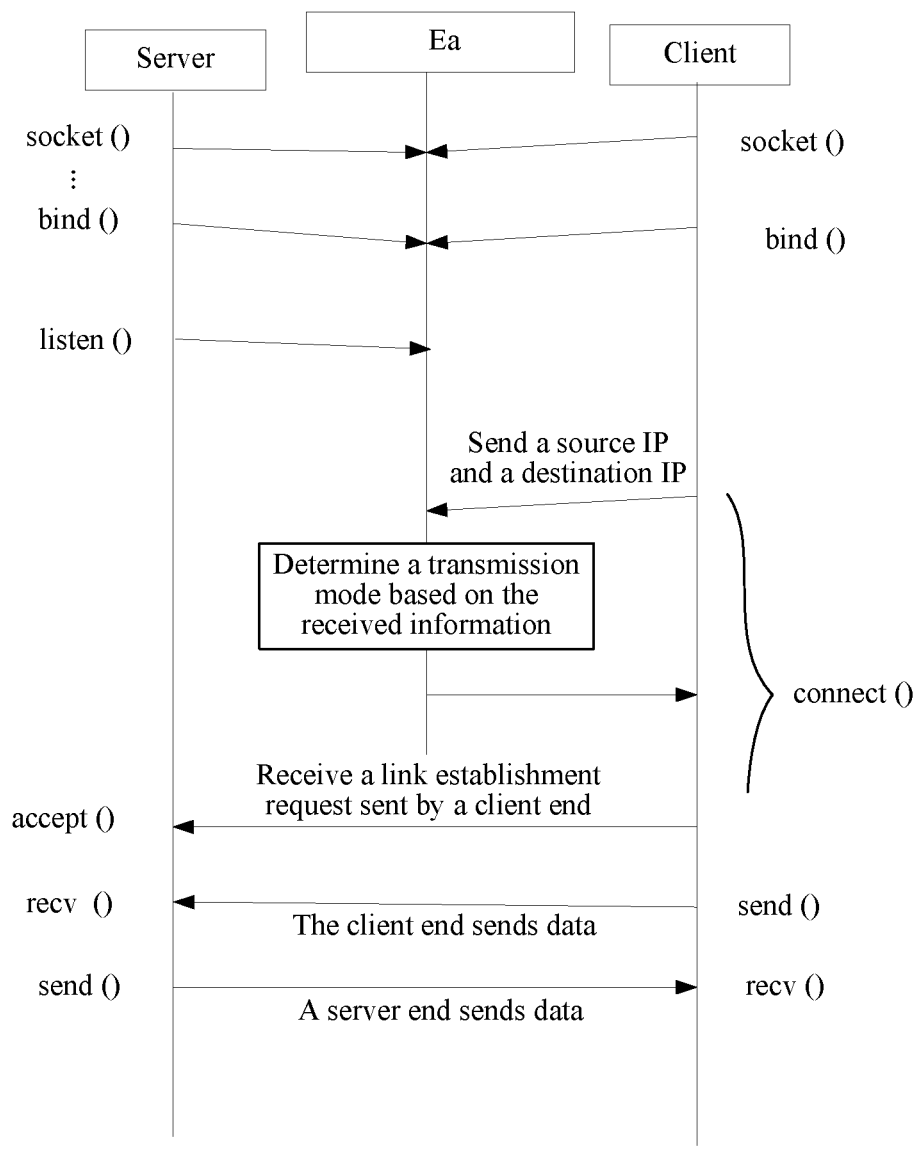
FIG. 5 is a schematic diagram of interaction between a server, an Ea, and a client in a C/S scenario according to an embodiment of the present invention.

The following describes a process of interaction between two applications from a perspective of a C/S architecture with reference to FIG. 5. One application is referred to as a client and is a connection initiator, and the other application is referred to as a server and is a peer end of the initiator. FIG. 5 describes an interaction process in which a default transmission mode is TCP/IP. In addition, in FIG. 5, an eagle (Ea) of the client and an Ea of the server are drawn as one. Because a deployment relationship between the client and the server is unknown, FIG. 5 may be understood as an abstract diagram illustrating that the client and the server interact with a module having an Ea function. It should be understood that FIG. 5 is only a schematic diagram.

For example, for a query task initiated by a user, query statement decomposition and data display may be completed by using an application client provided on a terminal. If data is stored in a data management center, tasks such as data queries need to be completed by a query process provided on a server in the data management center. If data is locally stored in the terminal, a data query task is processed by a read/write process running in an operating system of the terminal. In this example, the application client provided on the terminal is the client, and the query process or the read/write process is the server.

It can be understood from the foregoing example that the client and the server are distinguished by roles of an application in execution of a task. One client may be corresponding to different servers in different tasks, and an application acting as a client in one task may act as a server in another task.

In one embodiment, it may be considered that an nSocket module and the Ea module implement a function of determining a transmission mode. The nSocket module is the foregoing instruction transmission module, and includes the redirected interface functions of the socket for calling by applications, the function library Lib nSocket (used to provide interface functions of a socket for applications) corresponding to the redirected interface functions of the socket, and the interface adaptation layer that are described above. The Ea module is the transmission configuration module described above. The server, the client, and the Ea all belong to an Ea system, and the Ea system is the foregoing system used to manage deployment information of applications.

The following specifically describes a process in which the server, the client, and the Ea interact with each other to implement communication when a default transmission mode is the TCP/IP protocol. In this process, the redirected interface functions of the socket are used, but function names of the interface functions of the socket are unchanged and the set of interface functions still comply with a general standard. In this case, the server and the client are unaware of a change in the interface functions during a communication process. In other words, the server and the client do not need to be improved to implement compatibility with the set of redirected interface functions of the socket.

A transmission configuration module may manage configuration information of applications. In a running state, the server calls redirected functions socket ( ) and bind ( ) of the socket, to complete registration with the Ea corresponding to the server. For example, deployment information of the server may be sent to the Ea by using bind ( ). Specifically, by using the function bind ( ) the server is bound to a port and the deployment information of the server is collected. The deployment information helps the Ea system determine the deployment relationship between the server and the client that need to communicate with each other. For descriptions of the deployment information, refer to the foregoing descriptions. For example, the deployment information of the server may include at least one of ID information, an IP address, a physical machine address, a virtual machine address, a container address, a listened IP address, bound port information, and the like that are of the server, and a specific implementation and a combination manner thereof are not limited. Deployment information of the client may include at least one of ID information, an IP address, a physical machine address, a virtual machine address, a container address, used port information, and the like that are of the client, and a specific implementation and a combination manner thereof are not limited.

The client completes registration with an Ea corresponding to the client in a similar manner. By using a function listen ( ), the server enters a state of listening to a link establishment message. In this state, an IP address and a port may be listened to, and the server may receive a link establishment request from another application. The client delivers the link establishment request by using a function connect ( ) of the socket, where the link establishment request includes a source address and a destination address of a link to be established. Because the function connect ( ) has been redirected and a function of the function connect ( ) has been changed, the function connect ( ) is used to forward the link establishment request to the Ea module for processing. It may be understood that the function connect ( ) is used to convert the link establishment request into a query request used to query for a deployment relationship, for processing by the Ea module. The Ea module determines the deployment relationship between the client and the server based on the query request (for example, the Ea module may query for the deployment information of the server based on the destination address, and may specifically query for the deployment information locally or request the deployment information from a central deployment node; the link establishment request is sent by the client, and the Ea module may also determine the deployment information of the client based on client-related information in the link establishment request); and determines a transmission mode based on the deployment relationship and a transmission mode selection policy that is managed by the Ea module. The client uses the determined transmission mode to send, to the server, the link establishment request on which transmission protocol encapsulation has been performed. It should be understood that different transmission modes are corresponding to different establishment requests, and the client uses the determined transmission mode to encapsulate information in the link establishment request, and then sends encapsulated information. For example, in this embodiment, the determined transmission mode is TCP/IP transmission, and therefore the link establishment request is a TCP/IP packet. The server parses a format of the received link establishment request to determine the transmission mode to be used for the connection, or a transmission configuration module corresponding to the server determines the transmission mode based on the client-related information in the link establishment request. For example, in this embodiment, the server may send a response message based on the link establishment request to establish a connection (by using a function accept ( ) of the socket).

In this way, the client and the server have both determined the transmission mode for the connection. The client determines send ( ) and recv ( ) sheaves of interface functions conforming to the transmission mode. For example, content corresponding to the send ( ) and recv ( ) sheaves of interface functions supporting the default transmission mode is redirected to content supporting the determined transmission mode, where the send ( ) and recv ( ) sheaves of interface functions are used to receive and send data in a transmission process after connection establishment. Similarly, after receiving a link establishment request initiated by the client end, an nSocket module on the server end identifies an optimum transmission method and redirects the send ( ) and recv ( ) sheaves of functions on the server end, and selects interface functions that are suitable for the transmission mode corresponding to the link.

It should be understood that the send ( ) sheaf of functions includes a plurality of functions used to perform a sending function, and a specific form of the functions may be Send.xx ( ). Similarly, the recv ( ) sheaf of interfaces includes a plurality of functions used to perform a receiving function, and a specific form of the functions may be Recv.xx ( ).

It should be understood that the foregoing described process includes a process in which a link establishment instruction is processed by the Ea module to determine a transmission mode, and therefore the link establishment process may take more time than the prior art in which a default transmission mode is used. However, on one hand, an application program does not care about transmission performance during the link establishment process; on the other hand, because an appropriate transmission mode is determined, transmission performance (which is specifically, for example, data transmission efficiency and avoidance of an unnecessary waste of network resources) during a data transmission process after the link establishment is better than transmission performance when an inappropriate transmission mode is used.

In another embodiment, the following describes a process in which the server, the client, and the Ea interact with each other to determine an appropriate transmission mode and uses the transmission mode to implement communication when a default transmission mode is UDP. This process is similar to the case in which a default transmission mode is the TCP protocol, and systematic descriptions are omitted herein. For related content, refer to the foregoing descriptions. However, when a default transmission mode is UDP, only a function bind ( ) rather than connect ( ) and listen ( ) exists. After the server and the client register with respective corresponding transmission configuration modules by using the function bind ( ) the client uses the function send ( ) that has been used at the first time and that complies with the UDP protocol (the function send ( ) has been redirected) to forward, to the Ea module, an instruction to be sent to the server (the instruction may be a write instruction including to-be-written data), so that the Ea module determines a transmission mode used for sending the request, and therefore the client sends the request to the server by using the transmission mode. It should be understood that the transmission mode is used for subsequent interaction between the client and the server. To be specific, the client redirects again, based on the determined transmission mode, the content in the send ( ) sheaf of functions supporting the UDP protocol to the content corresponding to the transmission mode, for use in subsequent interaction. In addition, the recv ( ) sheaf of functions supporting the UDP protocol by default is redirected similarly, for redirection to the content corresponding to the transmission mode, so that the determined transmission mode is used in subsequent interaction. It may be understood that, in this aspect, the function connect ( ) implements a function similar to that of the function bind ( ) in the TCP protocol. Similarly, the server redirects the content of the send ( ) and recv ( ) sheaves of functions based on a transmission protocol complied with by a packet that is received at the first time, so that the determined transmission mode is used in subsequent interaction. In this way, interface functions of a prior-art socket are redirected without an API interface of the socket changed, to change a processing process on a connection request delivered by an application, and specifically the connection request is processed by using an nSocket module and an Ea module. Therefore, a transmission mode between two applications that need to interact with each other may be determined based on deployment information of the two applications that need to interact with each other and the transmission mode selection policy, and then the transmission mode is used to transmit information. In this way, an appropriate transmission mode can be selected more flexibly. This improves transmission performance such as data transmission efficiency, and avoids an unnecessary waste of transmission resources and a drop in data transmission efficiency that are caused by usage of an inappropriate transmission mode during an information transmission process.

Figure 6:
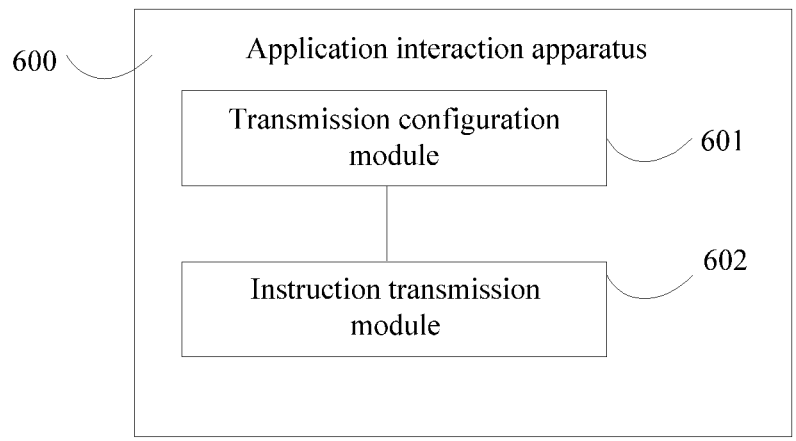
FIG. 6 is a schematic structural diagram of an application interaction apparatus according to an embodiment of the present invention.

FIG. 6 shows an application interaction apparatus 600. The apparatus includes a transmission configuration module 601 and an instruction transmission module 602, where the transmission configuration module 601 is configured to: receive a first instruction, where the first instruction includes an identifier of a first application and an identifier of a second application; determine deployment information of the first application and deployment information of the second application based on the first instruction, where the deployment information of the first application includes a location of a first node in which the first application is located, and the deployment information of the second application includes a location of a second node in which the second application is located; and determine an information transmission mode between the first application and the second application based on the deployment information of the first application, the deployment information of the second application, and a transmission mode selection policy, where the transmission mode selection policy includes a correspondence between the deployment information of the first application and the transmission mode and a correspondence between the deployment information of the second application and the transmission mode, or the transmission mode selection policy includes a correspondence between the transmission mode and a deployment relationship between the first application and the second application, and the deployment relationship between the first application and the second application includes a relationship between the location of the first node and the location of the second node; and the instruction transmission module 602 is configured to use the transmission mode to transmit information that is to be transmitted to the second application by the first application.

In an embodiment, the first instruction is a query instruction, and the query instruction is used to query for the deployment information of the first application and the deployment information of the second application, or the query instruction is used to query for the transmission mode between the first application and the second application.

Correspondingly, in receiving the first instruction, the transmission configuration module 601 is configured to receive the query instruction by using a first interface function of a socket, where content of a function library called by the first interface function is set to being used to process a connection instruction or a write instruction delivered by the first application into the query instruction, and send the query instruction to the transmission configuration module for processing to determine the transmission mode, the connection instruction indicates that the first application requests to establish a connection to the second application, and the write instruction indicates that the first application instructs to write, into a first storage unit, information that is to be transmitted to the second application.

In an embodiment, the first instruction is a connection instruction or a write instruction delivered by the first application, the connection instruction indicates that the first application requests to establish a connection to the second application, and the write instruction indicates that the first application instructs to write, into a first storage unit, information that is to be transmitted to the second application.

Correspondingly, in receiving the first instruction, the transmission configuration module 601 is configured to receive the connection instruction or the write instruction by using a first interface function of a socket, where content of a function library called by the first interface function is set to being used to send the connection instruction or the write instruction delivered by the first application, to the transmission configuration module for processing to determine the transmission mode.

In an embodiment, the apparatus further includes a second storage module and a third storage module, where the third storage module is a storage that is the same as or different from the second storage module; and in the aspect of determining the deployment information of the first application and the deployment information of the second application based on the first instruction, the transmission configuration module 601 is configured to obtain the deployment information of the first application from the second storage module based on the identifier of the first application; and the transmission configuration module 601 obtains the deployment information of the second application from the third storage module based on the identifier of the second application; or when the deployment information of the second application is not stored in the third storage module, the transmission configuration module obtains the deployment information of the second application from a global configuration node based on the identifier of the second application.

In an embodiment, the location of the first node in which the first application is located includes network information of the first application, network information of the first node, or address information of the node in which the first application is located, and the location of the second node in which the second application is located includes network information of the second application, network information of the second node, or address information of the node in which the second application is located.

In addition, in an embodiment, the transmission mode includes one of the TCP/IP, the UDP, RDMA, memory sharing, and interprocess communication (Domain_Socket).

In an embodiment, the first node is a first container, and the second node is a second container; and in determining a transmission mode for information transmission between the first application and the second application based on the deployment information of the first application, the deployment information of the second application, and a transmission mode selection policy, the transmission configuration module 601 is configured to: when the first container and the second container are located in a same physical machine and the first container and the second container belong to a same pod, determine that the transmission mode for information transmission between the first application and the second application is memory sharing; or the transmission configuration module is configured to: when the first container and the second container are located in a same physical machine and the first container and the second container belong to different pods, determine that the transmission mode for information transmission between the first application and the second application is interprocess communication (Domain_Socket).

In an embodiment, in using the transmission mode to transmit information that is to be transmitted to the second application by the first application, the instruction transmission module 602 is configured to: configure an interface function of the socket based on the transmission mode returned by the transmission configuration module; and use the transmission mode to transmit the information to the second application by using the configured second interface function of the socket.

In an embodiment, the transmission configuration module 601 is further configured to: receive a second instruction sent by the first application, where the second instruction includes the deployment information of the first application; store the deployment information of the first application into the second storage module; and send the deployment information of the first application to the global configuration node.

In conclusion, it can be learnt that the apparatus corresponding to FIG. 6 is corresponding to the foregoing method embodiment, and is corresponding to the first node in the system embodiment. Descriptions of the foregoing embodiments and the foregoing descriptions can help explain implementation details of the apparatus 600, where the transmission configuration module 601 is the foregoing transmission configuration module, and the instruction transmission module 602 is the foregoing nSocket module. In this case, by using the transmission configuration module 601 and the instruction transmission module 602, a processing process on a connection request delivered by an application is changed. Therefore, a transmission mode between two applications that need to interact with each other may be determined based on deployment information of the two applications that need to interact with each other and the transmission mode selection policy, and then the transmission mode is used to transmit information. In this way, an appropriate transmission mode can be selected more flexibly. This improves transmission performance such as data transmission efficiency, and avoids an unnecessary waste of transmission resources and a drop in data transmission efficiency that are caused by usage of an inappropriate transmission mode during an information transmission process.

For other descriptive details of the apparatus shown in FIG. 6, refer to the foregoing related descriptions. Details are not described herein again.

In one embodiment, the second node described above may include a similar transmission configuration module and a similar instruction transmission module, so as to use the foregoing method to determine the transmission mode between the second application running in the second node and the first application. These mainly include that the second application registers the deployment information of the second application with the transmission configuration module, the second application determines the transmission mode by using the transmission configuration module, and the second application receives information from or sends information to the first application by using the instruction transmission module. For details, a person skilled in the art may refer to the foregoing related descriptions. Details are not described herein again.

Figure 7:
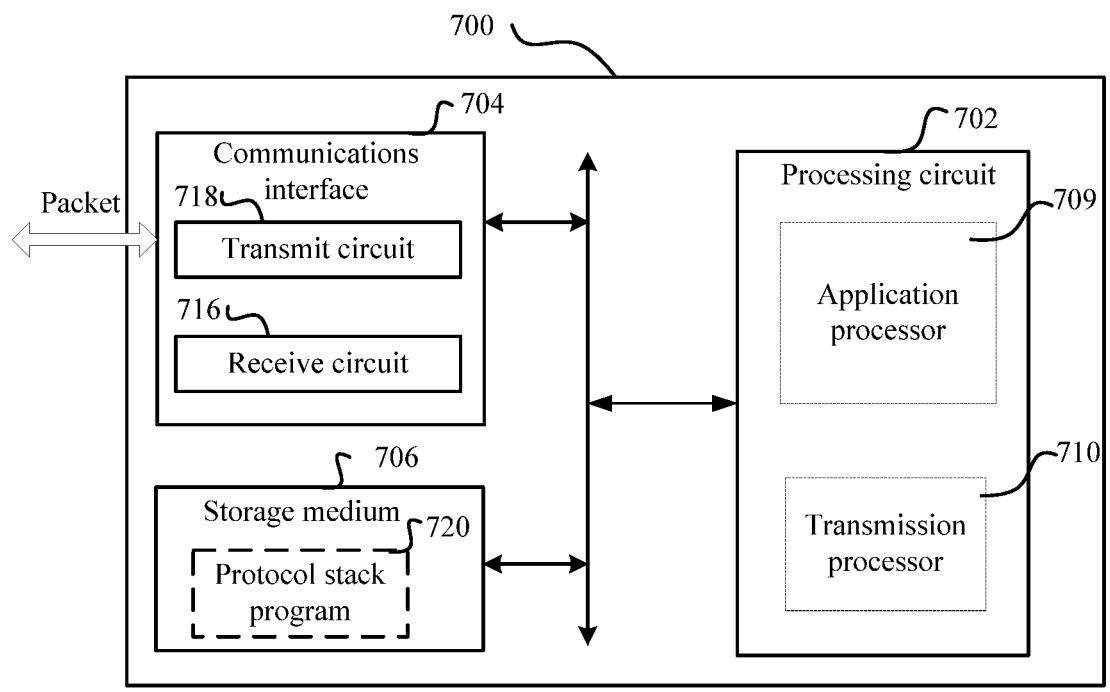
FIG. 7 is a schematic structural diagram of a physical machine according to an embodiment of the present invention.

In addition, a specific form of the apparatus shown in FIG. 6 is shown in FIG. 7. A schematic structural diagram of an apparatus shown in FIG. 7 is applicable to the first node, the second node, and the global configuration node that are described above. The apparatus includes a processing circuit 702 and a communications interface 704 connected to the processing circuit 702. In some cases, the apparatus may further include a storage medium 706. The processing circuit 702 is configured to implement the application interaction method in the foregoing method embodiment by processing code in the storage medium 706. For example, the transmission configuration module and the instruction transmission module that are described above may be implemented by processing the code in the storage medium 706 by the processing circuit 702.

The processing circuit 702 is configured to: process data, control data access and storage, send a command, and control other devices to perform operations. The processing circuit 702 may be implemented as one or more processors, one or more controllers, and/or other structures that may be used to execute a program and the like. The processing circuit 702 may specifically include at least one of a general purpose processor, a digital signal processor (DSP), an application-specific integrated circuit (ASIC), a field programmable gate array (FPGA), or other programmable logic devices. It should be understood that when the processing circuit 702 is an ASIC, an FPGA, or another programmable logic device, the storage medium 706 may be integrated into the processing circuit 702. The general purpose processor may include a microprocessor, and any conventional processor, controller, microcontroller, or state machine. The processing circuit 702 may alternatively be implemented as a computing component, for example, a combination of a DSP and a microprocessor.

In an embodiment, the apparatus 700 is an intelligent terminal, for example, a mobile phone, where a processing circuit of the terminal includes an application processor 709 and a transmission processor 710.

It should be understood that FIG. 7 is merely a schematic diagram in an implementation. In this case, the apparatus has a storage medium (for example, a memory) independent of the processing circuit 702, where the storage medium, the processing circuit 702, and the communications interface 704 may be connected by using a bus. For example, this case is applicable to servers and mobile phone terminals. However, it should be understood that in another implementation, when the processing circuit 702 is an ASIC, an FPGA, or another programmable logic device, the storage medium may be integrated into the processing circuit 702. This is different from what is shown in the figure. For example, this implementation may be used for some routers, gateways, and some devices in a power system such as meters. This is not limited in this embodiment of the present invention.

The storage medium 706 may include a computer readable storage medium, for example, a magnetic storage device (for example, a hard disk, a floppy disk, and a magnetic stripe), an optical storage medium (for example, a digital versatile disc (DVD)), a smart card, a flash memory device, a random access memory (RAM), a read-only memory (ROM), a programmable ROM (PROM), an erasable PROM (EPROM), a register, or any combination thereof. The storage medium 706 may be coupled to the processing circuit 702, so that the processing circuit 702 may read information from and write information into the storage medium 706. Specifically, the storage medium 706 may be integrated into the processing circuit 702, or the storage medium 706 and the processing circuit 702 may be separate.

The storage medium 706 may store a protocol stack program 720, and deployment information of an application running on the apparatus 700.

The communications interface 704 may include a circuit and/or a program to implement bidirectional communication between user equipment and one or more wireless network devices (for example, a base station and a server). For example, the communications interface 704 may be a transceiver. The transceiver may include a group of devices having a receiving function (for example, include at least one of a group of interfaces, a group of antennas, and a receive circuit 716), and a group of devices having a sending function (for example, include at least one of another group of interfaces, another group of antennas, and a transmit circuit 718), or may be a group of devices incorporating a receiving function and a sending function (for example, a group of interfaces or a group of antennas). In an implementation, the communications interface 704 may be coupled to one or more antennas (not shown in FIG. 7), and may include at least one receive circuit 716 and/or at least one transmit circuit 718.

Figure 8:
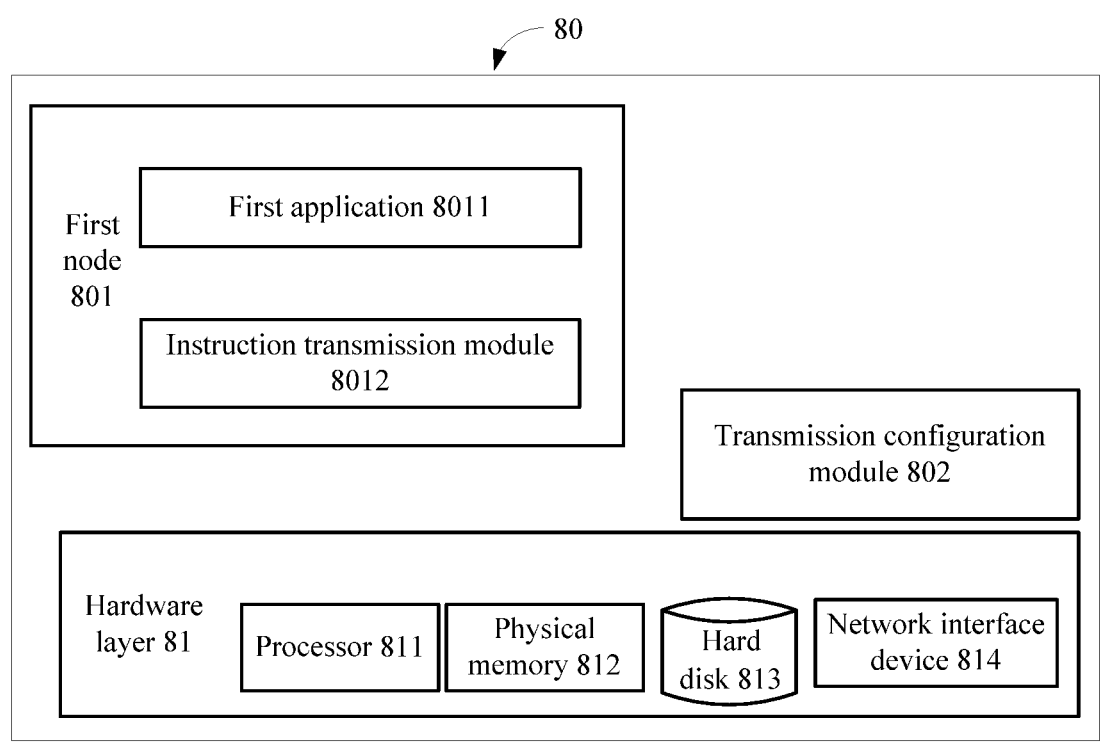
FIG. 8 is a schematic structural diagram of another physical machine according to an embodiment of the present invention.

The apparatus corresponding to FIG. 6 may be implemented in another manner, for example, a physical machine shown in FIG. 8. The physical machine shown in FIG. 8 may be described as an application interaction apparatus in a virtualization scenario. The physical machine includes a hardware layer, and a first node 801 and a transmission configuration module 802 that run on the hardware layer, where a first application runs in the first node 801, and the first node 801 is a virtual machine or a container running on the hardware layer.

The transmission configuration module 802 is configured to: receive a first instruction, where the first instruction includes an identifier of the first application and an identifier of a second application; determine deployment information of the first application and deployment information of the second application based on the first instruction, where the deployment information of the first application includes a location of the first node 801 in which the first application is located, and the deployment information of the second application includes a location of a second node in which the second application is located; and determine an information transmission mode between the first application and the second application based on the deployment information of the first application, the deployment information of the second application, and a transmission mode selection policy, where the transmission mode selection policy includes a correspondence between the deployment information of the first application and the transmission mode and a correspondence between the deployment information of the second application and the transmission mode, or the transmission mode selection policy includes a correspondence between the transmission mode and a deployment relationship between the first application and the second application, and the deployment relationship between the first application and the second application includes a relationship between the location of the first node 801 and the location of the second node; and the first node 801 is configured to use the transmission mode to transmit information to the second application.

The hardware layer 81 may include a processor 811, a physical memory 812, a hard disk 813, and a network interface device 814. There may be one or more processors

811. The network interface device 814 may be a network adapter or a network interface card, and is configured to establish a connection to any network that can be connected, for example, the Internet or an enterprise network. For example, the hardware layer includes a second storage module described below, or further includes a third storage module described below.

In an embodiment, the first instruction is a query instruction, and the query instruction is used to query for the deployment information of the first application 8011 and the deployment information of the second application, or the query instruction is used to query for the deployment relationship between the first application 8011 and the second application, or the query instruction is used to query for the transmission mode between the first application 8011 and the second application.

Correspondingly, the first node 801 further includes an instruction transmission module 8012; and the instruction transmission module 8012 is configured to: process a connection instruction or a write instruction delivered by the first application 8011 into the query instruction, and send the query instruction to the transmission configuration module 802 for processing to determine the transmission mode, where the connection instruction indicates that the first application 8011 requests to establish a connection to the second application, and the write instruction indicates that the first application 8011 instructs to write, into a first storage unit, information that is to be transmitted to the second application.

In an embodiment, in receiving the first instruction, the transmission configuration module 802 is configured to receive the query instruction by using the instruction transmission module 8012.

Correspondingly, the first instruction is a connection instruction or a write instruction delivered by the first application 8011, the connection instruction indicates that the first application 8011 requests to establish a connection to the second application, and the write instruction indicates that the first application 8011 instructs to write, into a first storage unit, information that is to be transmitted to the second application.

In an embodiment, the first node 801 further includes an instruction transmission module 8012; the instruction transmission module 8012 is configured to send the connection instruction or the write instruction delivered by the first application 8011, to the transmission configuration module 802 for processing to determine the transmission mode; and in the aspect of receiving the first instruction, the transmission configuration module 802 is configured to receive the connection instruction or the write instruction by using the instruction transmission module 8012.

In an embodiment, in determining deployment information of the first application 8011 and deployment information of the second application based on the first instruction, the transmission configuration module 802 is configured to obtain the deployment information of the first application 8011 from a second storage module of the hardware layer based on the identifier of the first application 8011; and the transmission configuration module is configured to obtain the deployment information of the second application from a third storage module of the hardware layer based on the identifier of the second application, where the third storage module is a memory that is the same as or different from the second storage module; or when the deployment information of the second application is not stored in the third storage module, the transmission configuration module is configured to obtain the deployment information of the second application from a global configuration node based on the identifier of the second application.

In an embodiment, the location of the first node 801 in which the first application 8011 is located includes network information of the first application 8011, network information of the first node 801, or address information of the node in which the first application 8011 is located, and the location of the second node in which the second application is located includes network information of the second application, network information of the second node, or address information of the node in which the first application 8011 is located.

In an embodiment, the transmission mode includes one of the Transmission Control Protocol/Internet Protocol TCP/IP, the User Datagram Protocol UDP, remote direct memory access RDMA, memory sharing, and interprocess communication (Domain_Socket).

In an embodiment, the first node 801 is a first container, and the second node is a second container; and the transmission configuration module 802 is configured to: when the first container and the second container are located in a same physical machine and the first container and the second container belong to a same pod, determine that the transmission mode for information transmission between the first application 8011 and the second application is memory sharing; or the transmission configuration module 802 is configured to: when the first container and the second container are located in a same physical machine and the first container and the second container belong to different pods, determine that the transmission mode for information transmission between the first application 8011 and the second application is interprocess communication (Domain_Socket).

In an embodiment, in using, by the first application 8011, the transmission mode to transmit information to the second application, the first node 801 is configured to configure the instruction transmission module 8012 based on the transmission mode returned by the transmission configuration module 802; and the first node 801 is configured to use the transmission mode to transmit the information to the second application by using the configured instruction transmission module 8012.

In an embodiment, the first node 801 is further configured to send a second instruction to the transmission configuration module 802, where the second instruction includes the deployment information of the first application 8011; the transmission configuration module 802 is further configured to store the deployment information of the first application 8011 into the second storage module; and the transmission configuration module 802 is further configured to send the deployment information of the first application 8011 to the global configuration node.

It should be understood that the transmission configuration module 802 in the embodiment corresponding to FIG. 8 is the transmission configuration module mentioned above, and the instruction transmission module 8012 is the instruction transmission module mentioned above. It can also be learnt that the physical machine corresponding to FIG. 8 can implement the method in the foregoing method embodiment. For implementation details and term explanations in the embodiment corresponding to FIG. 8, refer to descriptions of foregoing corresponding content. Details are not described herein again.

In this case, by using the transmission configuration module 801 and the instruction transmission module 8012, a processing process on a connection request delivered by an application is changed. Therefore, a transmission mode between two applications that need to interact with each other may be determined based on deployment information of the two applications that need to interact with each other and the transmission mode selection policy, and then the transmission mode is used to transmit information. In this way, an appropriate transmission mode can be selected more flexibly. This improves transmission performance such as data transmission efficiency, and avoids an unnecessary waste of transmission resources and a drop in data transmission efficiency that are caused by usage of an inappropriate transmission mode during an information transmission process.

In the specification, claims, and accompanying drawings of the present invention, the terms "first", "second", "third", "fourth", and so on (if existent) are intended to distinguish between similar objects but do not necessarily indicate a specific order or sequence.

A person skilled in the art can understand that a communications system may include more or fewer parts than shown in FIG. 2 or include parts different from those shown in FIG. 2, and FIG. 2 only shows parts more related to the implementations disclosed in the embodiments of the present invention. For example, although FIG. 2 shows the first node and the second node, a person skilled in the art can understand that a communications system may include more nodes.

The foregoing describes in detail the application interaction method, apparatus, and system that are provided in the embodiments of the present invention. Although the principle and implementations of the present invention are described by using specific examples, the foregoing embodiments are only intended to help understand the method and core idea of the present invention. In addition, with respect to the specific implementations and applicability, modifications may be made by a person of ordinary skill in the art based on the idea of the present invention. Therefore, the content of the specification shall not be construed as a limitation on the present invention.

What is claimed is:

1. An application interaction method, comprising:
   receiving a query instruction using a first interface function of a socket, wherein the query instruction has an identifier of a first application and an identifier of a second application, wherein content of a function library called by the first interface function is set to being used to process a connection instruction or a write instruction delivered by the first application into the query instruction, and send the query instruction for processing to determine a transmission mode, the connection instruction indicates that the first application requests to establish a connection to the second application, and the write instruction indicates that the first application instructs to write, into a first storage unit, information to be transmitted to the second application;
   determining deployment information of the first application and deployment information of the second application based on the query instruction, wherein the deployment information of the first application comprises a location of a first node in which the first application is located, and the deployment information of the second application comprises a location of a second node in which the second application is located;
   determining a transmission mode between the first application and the second application based on the deployment information of the first application, the deployment information of the second application, and a transmission mode selection policy, wherein the transmission mode selection policy comprises a correspondence between the deployment information of the first application and the transmission mode and a correspondence between the deployment information of the second application and the transmission mode, or the transmission mode selection policy comprises a correspondence between the transmission mode and a deployment relationship between the first application and the second application, and the deployment relationship between the first application and the second application comprises a relationship between the location of the first node and the location of the second node; and
   transmitting information to the second application using the transmission mode.

2. The method according to claim 1, wherein the query instruction is used to query for the deployment information of the first application and the deployment information of the second application, or the query instruction is used to query for the deployment relationship between the first application and the second application, or the query instruction is used to query for the transmission mode between the first application and the second application.

3. The method according to claim 1, wherein the location of the first node comprises network information of the first application, network information of the first node, or address information of the first node, and wherein the location of the second node comprises network information of the second application, network information of the second node, or address information of the second node.

4. The method according to claim 1, wherein the transmission mode comprises one of the Transmission Control Protocol/Internet Protocol (TCP/IP), the User Datagram Protocol (UDP), remote direct memory access (RDMA), memory sharing, and interprocess communication.

5. The method according to claim 1, wherein the first node is a first container, and the second node is a second container; and wherein the method further comprises:
   when the first container and the second container are located in a same physical machine and the first container and the second container belong to a same POD, determining, that the transmission mode for information transmission between the first application and the second application is memory sharing; or
   when the first container and the second container are located in a same physical machine and the first container and the second container belong to different pods, determining, that the transmission mode for information transmission between the first application and the second application is interprocess communication.

6. The method according to claim 1, further comprising:
   configuring, by the first application, an interface function of a socket based on the transmission mode; and
   using, by the first application, the transmission mode to transmit the information to the second application using the configured interface function of the socket.

7. A physical machine, wherein the physical machine is used for application interaction, and the physical machine comprises a processor, a memory, and a communications interface; the processor, the memory, and the communications interface are connected by using a bus; the communications interface is configured to execute a program in the memory to send information to or receive information from another device; and the processor is configured to perform a method, wherein the method comprises:

receiving a query instruction using a first interface function of a socket, wherein the query instruction has an identifier of a first application and an identifier of a second application, wherein content of a function library called by the first interface function is set to being used to process a connection instruction or a write instruction delivered by the first application into the query instruction, and send the query instruction for processing to determine a transmission mode, the connection instruction indicates that the first application requests to establish a connection to the second application, and the write instruction indicates that the first application instructs to write, into a first storage unit, information that is to be transmitted to the second application;

determining deployment information of the first application and deployment information of the second application based on the query instruction, wherein the deployment information of the first application comprises a location of a first node in which the first application is located, and the deployment information of the second application comprises a location of a second node in which the second application is located;

determining a transmission mode between the first application and the second application based on the deployment information of the first application, the deployment information of the second application, and a transmission mode selection policy, wherein the transmission mode selection policy comprises a correspondence between the deployment information of the first application and the transmission mode and a correspondence between the deployment information of the second application and the transmission mode, or the transmission mode selection policy comprises a correspondence between the transmission mode and a deployment relationship between the first application and the second application, and the deployment relationship between the first application and the second application comprises a relationship between the location of the first node and the location of the second node; and transmitting information to the second application using the transmission mode.

8. The physical machine according to claim 7, wherein the transmission mode comprises one of the Transmission Control Protocol/Internet Protocol (TCP/IP), the User Datagram Protocol (UDP), remote direct memory access (RDMA), memory sharing, and interprocess communication.

9. The physical machine according to claim 7, wherein the first node is a first container and the second node is a second container; and the method further comprises:

when the first container and the second container are located in a same physical machine and the first container and the second container belong to a same POD, determining that the transmission mode for information transmission between the first application and the second application is memory sharing; or when the first container and the second container are located in a same physical machine and the first container and the second container belong to different PODs, determining that the transmission mode for information transmission between the first application and the second application is interprocess communication.

10. The physical machine according to claim 7, wherein the method further comprises:

configuring, by the first application, an interface function of a socket based on the transmission mode; and using, by the first application, the transmission mode to transmit the information to the second application using the configured interface function of the socket.

11. A non-transitory computer-readable medium storing computer instructions for application interaction, which when executed by one or more processors, cause the one or more processors to perform a method, the method comprising:

receiving a query instruction using a first interface function of a socket, wherein the query instruction has an identifier of a first application and an identifier of a second application, wherein content of a function library called by the first interface function is set to being used to process a connection instruction or a write instruction delivered by the first application into the query instruction, and send the query instruction for processing to determine a transmission mode, the connection instruction indicates that the first application requests to establish a connection to the second application, and the write instruction indicates that the first application instructs to write, into a first storage unit, information that is to be transmitted to the second application;

determining deployment information of the first application and deployment information of the second application based on the query instruction, wherein the deployment information of the first application comprises a location of a first node in which the first application is located, and the deployment information of the second application comprises a location of a second node in which the second application is located;

determining a transmission mode between the first application and the second application based on the deployment information of the first application, the deployment information of the second application, and a transmission mode selection policy, wherein the transmission mode selection policy comprises a correspondence between the deployment information of the first application and the transmission mode and a correspondence between the deployment information of the second application and the transmission mode, or the transmission mode selection policy comprises a correspondence between the transmission mode and a deployment relationship between the first application and the second application, and the deployment relationship between the first application and the second application comprises a relationship between the location of the first node and the location of the second node; and transmitting information to the second application using the transmission mode.

12. The medium according to claim 11, wherein the transmission mode comprises one of the Transmission Control Protocol/Internet Protocol (TCP/IP), the User Datagram Protocol (UDP), remote direct memory access (RDMA), memory sharing, and interprocess communication.

13. The medium according to claim 11, wherein the first node is a first container and the second node is a second container; and wherein the method further comprises:

when the first container and the second container are located in a same physical machine and the first container and the second container belong to a same POD, determining that the transmission mode for information transmission between the first application and the second application is memory sharing; or when the first container and the second container are located in a same physical machine and the first container and the second container belong to different PODs, determining that the transmission mode for information transmission between the first application and the second application is interprocess communication.

14. An application interaction method, comprising:
receiving a connection instruction or a write instruction using a first interface function of a socket, wherein content of a function library called by the first interface function is set to being used to send the connection instruction or the write instruction delivered by a first application, for processing to determine the transmission mode, wherein the connection instruction or the write instruction having an identifier of the first application and an identifier of a second application;
determining deployment information of the first application and deployment information of the second application based on the connection instruction or the write instruction, wherein the deployment information of the first application comprises a location of a first node in which the first application is located, and the deployment information of the second application comprises a location of a second node in which the second application is located;
determining a transmission mode between the first application and the second application based on the deployment information of the first application, the deployment information of the second application, and a transmission mode selection policy, wherein the transmission mode selection policy comprises a correspondence between the deployment information of the first application and the transmission mode and a correspondence between the deployment information of the second application and the transmission mode, or the transmission mode selection policy comprises a correspondence between the transmission mode and a deployment relationship between the first application and the second application, and the deployment relationship between the first application and the second application comprises a relationship between the location of the first node and the location of the second node; and
transmitting information to the second application using the transmission mode.

15. The method according to claim 14, wherein the connection instruction indicates that the first application requests to establish a connection to the second application, and the write instruction indicates that the first application instructs to write, into a first storage unit, information that is to be transmitted to the second application.

16. The method according to claim 14, wherein the first node is a first container, and the second node is a second container; and wherein the method further comprises:
when the first container and the second container are located in a same physical machine and the first container and the second container belong to a same POD, determining, that the transmission mode for information transmission between the first application and the second application is memory sharing; or
when the first container and the second container are located in a same physical machine and the first container and the second container belong to different pods, determining, that the transmission mode for information transmission between the first application and the second application is interprocess communication.

17. A physical machine, wherein the physical machine is used for application interaction, and the physical machine comprises a processor, a memory, and a communications interface; the processor, the memory, and the communications interface are connected by using a bus; the communications interface is configured to execute a program in the memory to send information to or receive information from another device; and the processor is configured to perform a method, wherein the method comprises:
receiving a connection instruction or a write instruction using a first interface function of a socket, wherein content of a function library called by the first interface function is set to being used to send the connection instruction or the write instruction delivered by a first application, for processing to determine the transmission mode, wherein the connection instruction or the write instruction having an identifier of the first application and an identifier of a second application;
determining deployment information of the first application and deployment information of the second application based on the connection instruction or the write instruction, wherein the deployment information of the first application comprises a location of a first node in which the first application is located, and the deployment information of the second application comprises a location of a second node in which the second application is located;
determining a transmission mode between the first application and the second application based on the deployment information of the first application, the deployment information of the second application, and a transmission mode selection policy, wherein the transmission mode selection policy comprises a correspondence between the deployment information of the first application and the transmission mode and a correspondence between the deployment information of the second application and the transmission mode, or the transmission mode selection policy comprises a correspondence between the transmission mode and a deployment relationship between the first application and the second application, and the deployment relationship between the first application and the second application comprises a relationship between the location of the first node and the location of the second node; and
transmitting information to the second application using the transmission mode.

18. The physical machine according to claim 17, wherein the connection instruction indicates that the first application requests to establish a connection to the second application, and the write instruction indicates that the first application instructs to write, into a first storage unit, information that is to be transmitted to the second application.

19. The physical machine according to claim 17, wherein the first node is a first container, and the second node is a second container; and wherein the method further comprises:
when the first container and the second container are located in a same physical machine and the first container and the second container belong to a same POD, determining, that the transmission mode for information transmission between the first application and the second application is memory sharing; or when the first container and the second container are located in a same physical machine and the first container and the second container belong to different pods, determining, that the transmission mode for information transmission between the first application and the second application is interprocess communication.

\* \* \* \* \*